United States Patent
Kato et al.

(10) Patent No.: US 6,505,909 B1
(45) Date of Patent: Jan. 14, 2003

(54) TEST PATTERN PRINTING METHOD, INFORMATION PROCESSING APPARATUS AND PRINTING APPARATUS

(75) Inventors: Masao Kato, Kawasaki (JP); Kentaro Yano, Yokohama (JP); Daigoro Kanematsu, Kawasaki (JP); Minako Kato, Yokohama (JP); Mitsuhiro Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/551,671

(22) Filed: Apr. 18, 2000

(30) Foreign Application Priority Data

Apr. 19, 1999 (JP) ............................................ 11-111495

(51) Int. Cl.7 ................................................ B41J 2/01
(52) U.S. Cl. ........................................ 347/19; 358/504
(58) Field of Search ............................. 347/19, 43, 48; 358/504

(56) References Cited

U.S. PATENT DOCUMENTS 5,898,443 A * 4/1999 Yoshino et al. ............... 347/19
6,027,200 A * 2/2000 Takahashi et al. ............. 347/19
6,126,264 A * 10/2000 Suzuki et al. ................. 347/19
6,132,024 A * 10/2000 Nelson et al. ................. 347/19

FOREIGN PATENT DOCUMENTS

JP          2661917          6/1997

* cited by examiner

Primary Examiner—Craig Hallacher
(74) Attorney, Agent, or Firm—Fitzpatrick, Cella, Harper & Scinto

(57) ABSTRACT

A printing information processing apparatus based on the present invention forms a patch by forming adjacent positions for each of the test area and for reference area composed of a predetermined single-color within a color reproducible range in coloring material used for a plurality of test areas mentioned above and at the same time forms a plurality of patches by changing the gradation in the test area composed of at least one coloring material among the coloring materials equipped with the printing means at the time of printing operation based on the printing means equipped with at least one ordinary coloring material and a special color having a color belonging to color reproducible range based on the ordinary coloring material, and at least one side of both patterns shall contain the special coloring material.

24 Claims, 17 Drawing Sheets

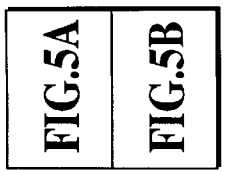
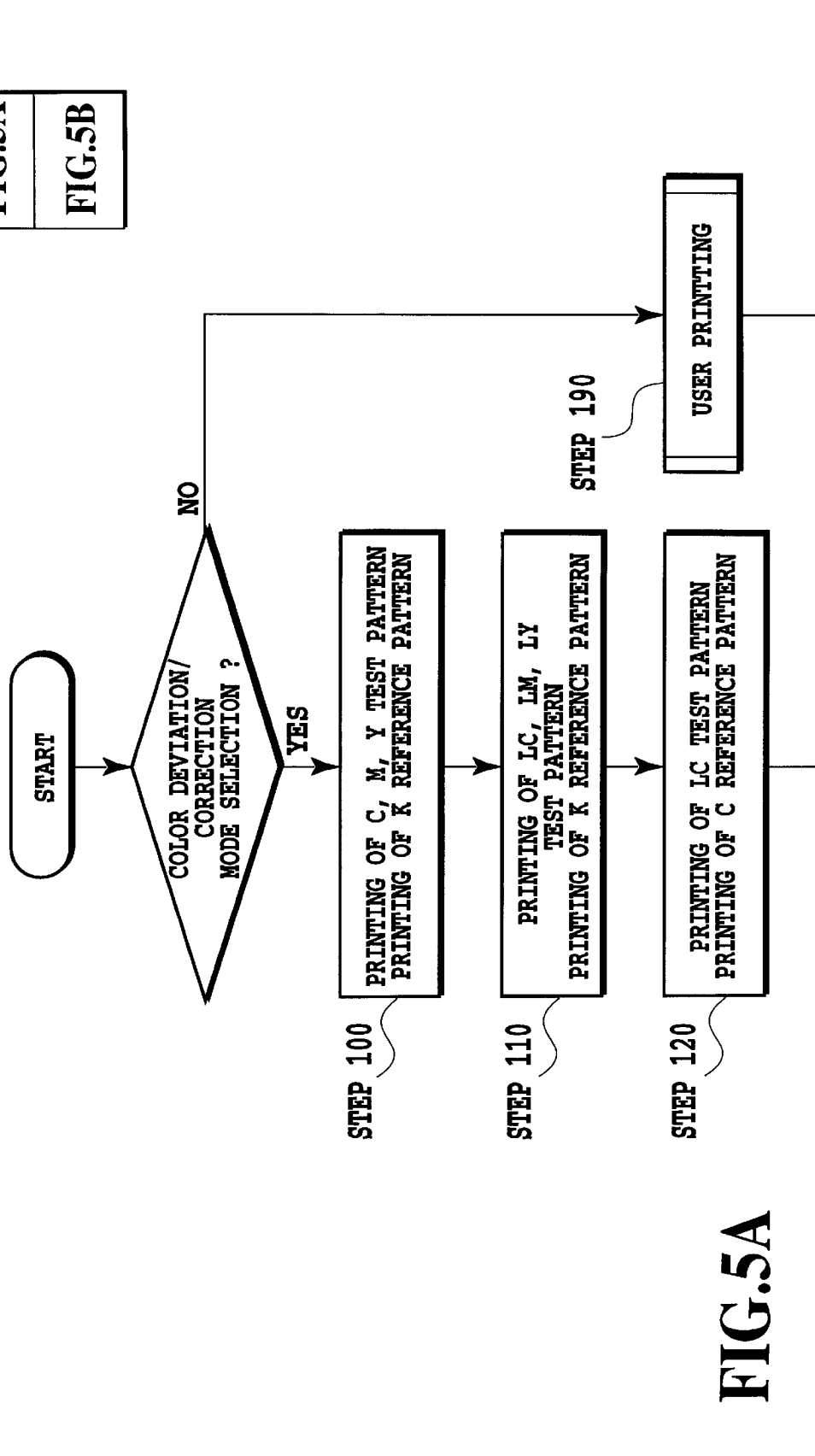
FIG. 5A

FIG.6A

PA → M INCREASES

Y INCREASES ↓

|  | (1) | (2) | (3) | (4) | (5) |
|---|---|---|---|---|---|
| (1) | C 128<br>M 96<br>Y 96<br>K 0<br>C 0<br>M 0<br>Y 0<br>K 128 | C 128<br>M 112<br>Y 96<br>K 0<br>C 0<br>M 0<br>Y 0<br>K 128 | C 128<br>M 128<br>Y 96<br>K 0<br>C 0<br>M 0<br>Y 0<br>K 128 | C 128<br>M 144<br>Y 96<br>K 0<br>C 0<br>M 0<br>Y 0<br>K 128 | C 128<br>M 160<br>Y 96<br>K 0<br>C 0<br>M 0<br>Y 0<br>K 128 |
| (2) | C 128<br>M 96<br>Y 112<br>K 0<br>C 0<br>M 0<br>Y 0<br>K 128 | C 128<br>M 112<br>Y 112<br>K 0<br>C 0<br>M 0<br>Y 0<br>K 128 | C 128<br>M 128<br>Y 112<br>K 0<br>C 0<br>M 0<br>Y 0<br>K 128 | C 128<br>M 144<br>Y 112<br>K 0<br>C 0<br>M 0<br>Y 0<br>K 128 | C 128<br>M 160<br>Y 112<br>K 0<br>C 0<br>M 0<br>Y 0<br>K 128 |
| PA1 / PA2 (3) | C 128<br>M 96<br>Y 128<br>K 0<br>C 0<br>M 0<br>Y 0<br>K 128 | C 128<br>M 112<br>Y 128<br>K 0<br>C 0<br>M 0<br>Y 0<br>K 128 | C 128<br>M 128<br>Y 128<br>K 0<br>C 0<br>M 0<br>Y 0<br>K 128 | C 128<br>M 144<br>Y 128<br>K 0<br>C 0<br>M 0<br>Y 0<br>K 128 | C 128<br>M 160<br>Y 128<br>K 0<br>C 0<br>M 0<br>Y 0<br>K 128 |
| (4) | C 128<br>M 96<br>Y 144<br>K 0<br>C 0<br>M 0<br>Y 0<br>K 128 | C 128<br>M 112<br>Y 144<br>K 0<br>C 0<br>M 0<br>Y 0<br>K 128 | C 128<br>M 128<br>Y 144<br>K 0<br>C 0<br>M 0<br>Y 0<br>K 128 | C 128<br>M 144<br>Y 144<br>K 0<br>C 0<br>M 0<br>Y 0<br>K 128 | C 128<br>M 160<br>Y 144<br>K 0<br>C 0<br>M 0<br>Y 0<br>K 128 |
| (5) | C 128<br>M 96<br>Y 160<br>K 0<br>C 0<br>M 0<br>Y 0<br>K 128 | C 128<br>M 112<br>Y 160<br>K 0<br>C 0<br>M 0<br>Y 0<br>K 128 | C 128<br>M 128<br>Y 160<br>K 0<br>C 0<br>M 0<br>Y 0<br>K 128 | C 128<br>M 144<br>Y 160<br>K 0<br>C 0<br>M 0<br>Y 0<br>K 128 | C 128<br>M 160<br>Y 160<br>K 0<br>C 0<br>M 0<br>Y 0<br>K 128 |

FIG.6B

COMBINATION A

| | EJECTION AMOUNT | CMY BALANCE | LCLMLY BALANCE | C-LC BALANCE | OFFSET AMOUNT | COMPUTATION RESULTS |
|---|---|---|---|---|---|---|
| C | LARGE | 3 | - | 3 | 0 | 3 |
| M | SMALL | 5 | - | - | 0 | 5 |
| Y | SMALL | 5 | - | - | 0 | 5 |
| LC | SMALL | - | 3 | 5 | 2 | 5 |
| LM | LARGE | - | 1 | - | 2 | 3 |
| LY | LARGE | - | 1 | - | 2 | 3 |

FIG.7A

COMBINATION B

| | EJECTION AMOUNT | CMY BALANCE | LCLMLY BALANCE | C-LC BALANCE | OFFSET AMOUNT | COMPUTATION RESULTS |
|---|---|---|---|---|---|---|
| C | SMALL | 3 | - | 3 | 2 | 5 |
| M | LARGE | 1 | - | - | 2 | 3 |
| Y | LARGE | 1 | - | - | 2 | 3 |
| LC | LARGE | - | 3 | 1 | 0 | 3 |
| LM | SMALL | - | 5 | - | 0 | 5 |
| LY | SMALL | - | 5 | - | 0 | 5 |

FIG.7B

COMBINATION C

| | EJECTION AMOUNT | CMY BALANCE | LCLMLY BALANCE | C-LC BALANCE | OFFSET AMOUNT | COMPUTATION RESULTS |
|---|---|---|---|---|---|---|
| C | LARGE | 3 | - | 3 | 0 | 3 |
| M | LARGE | 3 | - | - | 0 | 3 |
| Y | LARGE | 3 | - | - | 0 | 3 |
| LC | SMALL | - | 3 | 5 | 2 | 5 |
| LM | SMALL | - | 3 | - | 2 | 5 |
| LY | SMALL | - | 3 | - | 2 | 5 |

TEST PATTERN PRINTING METHOD, INFORMATION PROCESSING APPARATUS AND PRINTING APPARATUS

This application is based on patent application Ser. No. 11-111495 (1999) filed Apr. 19, 1999 in Japan, the content of which is incorporated herein by reference.

BACKGROUND OF THE INVENTION

1. Field of the Invention

The present invention relates to a printing system which conducts printing operation by using coloring materials of a plurality of colors, and more specifically to a printing system equipped with a calibration function, a printing system which can form test patterns in order to detect printing characteristics such as output density balance of each color, an information processing apparatus, and a printing apparatus.

2. Description of Related Art

Multi-media is making a rapid progress nowadays along with the propagation of personal computers and OA (office automation) equipment as well as the development of communication technology. Under such circumstance, there is a tendency that color images are increasingly demanded. As output devices for color images, various printing systems have been developed. For example, there are printers of the ink jet system, the electro-photographic system, and the heat transfer system.

In the case of current printing devices where photograph-like color image output is frequently produced, color images generally use three coloring materials (colorants) of chromatic colors, namely, cyan (C), magenta (M), and yellow (Y) or four coloring materials that include the three chromatic color materials and black (K). However, because of the balance of the output characteristics (reflection density or lightness, i.e. brightness of color or darkness of color, saturation, hue, etc.) among difference printing heads that print each coloring material, it does not necessarily follow that they are suitable for all apparatuses.

For instance, in an ink jet printing device, among printing heads, there are variations in an amount of heat (film thickness) generated by heaters to eject ink, and variations in size (diameter) of ink ejection nozzles, causing differences in the amount of ejected ink among the individual printing heads. There are some cases in which such individual differences give rise to a color deviation (a density deviation). In such cases, a desired image quality cannot be obtained. Thus, in order to compensate for such color deviations, the printing apparatus is equipped with various calibration functions such as γ correction as well as various other color deviation correction means.

In the calibration, a detection pattern is actually printed on predetermined printing media. Data showing color deviation as obtained by detection from such a printing result is used as data to compensate for the color deviation.

As a color deviation detection method based on individual differences among the devices, two methods are actually used. In one method, the detection pattern is detected by using a detection instrument such as a scanner. In the other method, the detection is conducted visually by eye.

Now, the detection method of each of the above-mentioned color deviations will be outlined below.

In the method using an input instrument such as a scanner, for instance, as used in Japanese Patent No. 2661917, a detection pattern is printed for each coloring material (colorant) consisting of C, M, Y, and K, and then, each pattern is read out with a scanner. A deviation between a value thus read out and an expected output value of each detection pattern Is detected. Based on such deviations, the method of correcting the color with γ value is disclosed.

At this time, there is one method in which as a detection pattern to detect the color deviation, a gradation pattern of each elemental color is printed along with a solid pattern of C, M, Y, and K; and not only the color deviation of a single gradation but also output characteristics of intermediate gradation is also detected, thereby improving the accuracy of color deviation. There is another method in which the detection correction accuracy is improved by printing patch patterns of secondary and tertiary colors which combine C, M. Y, and K, individually.

On the other hand, in the method in which visual detection is used, the following method is employed.

Since it is difficult to detect absolute values of the output characteristics of the respective elemental colorants, principally 3 coloring materials of C, M, and Y are mixed. A detection pattern of the tertiary color of this mixture is printed. Color deviations are detected therefrom. More specifically, in the method, a printing pattern formed by using a tertiary color obtained by mixing the coloring materials of C, M, and Y at a ratio where achromatic color is expected when using printing heads each having an average discharge amount printed at a center, a plurality of test pattens having substantially gray color obtained by mixing the coloring materials with a ratio slightly changed are printed around the printing pattern, and then a test pattern which is the closest to the central achromatic color among the test patterns is visually selected. In this way, the output characteristics of each coloring materials of C, M and Y are detected. In other words, this detection method utilizes the fact that the gray color patterns are no longer an achromatic color when an effect of the color material having large output characteristics is caused by a slight deviation in balance of the output characteristics of C, M and Y. If this detection method is used, even in the case of visual detection, color deviation can be detected easily.

With respect to cases in which color deviation detection is conducted by this visual detection method, one example of the detection pattern will be explained using FIG. 11.

In FIG. 11, the detection pattern P shown therein consists of a set of patches (pattern set) composed of a pair of top and bottom frames in contact with each other, with sets more than one (in this case the number is 5) being aligned sideways to thereby constitute P (1, 1) to P (5, 5). In the figure, the four numbers shown in the upper frame and the lower frame inside of each patch represent multi-value gradation levels of C, M, Y, and X from the top. In addition, said upper frames are patch patterns of process black (PCBk) which is made by mixing coloring materials having chromatic colors C, M and Y, and the patch pattern of the lower side is composed of a coloring material of achromatic color, black (K) only. The PCBk of the upper side has Y fixed at a level of 128. Gradation values for C become larger as patches are arranged closer to the right side (i.e., the density becomes higher), and gradation values for M become larger as patches are arranged at the lower side.

As described above, since the patch pattern of PCBk and the patch pattern of Bk are laid out in the above detection pattern, it becomes possible to improve the detection accuracy based on visual detection to a considerable degree. This is a detection method that utilizes visual characteristics of a human being such that even slight color deviations can be detected in the case a plurality of objects are placed adjacent to each other. Hereinafter, this comparison method shall be referred to as the adjacency comparison method.

According to this adjacency comparison method, even if the color difference is at a sufficiently low level of 0.8 to 1.6, it is known that the color difference can be recognized. As a result, in comparison with vaguely selecting a patch that is closest to an achromatic color from among a plurality of PCBk patches, the detection accuracy can be improved significantly. For instance, even in case the color difference is at a sufficiently low level such as 0.8 to 1.6, the detector can recognize the difference reliably. By inputting correction data obtained on the basis of a gradation value of each color material that forms a detection pattern that is closest to black K, calibration is conducted, and a suitable image having no color deviation is obtained.

In the case of the printing apparatus in which the color deviation of the individual apparatus is compensated by said calibration, the suitability of correction data used for the calibration is an important factor in determining the quality of a printed image. Furthermore, if a detection apparatus such as a scanner is used for such detection, a high accuracy color deviation detection becomes possible, and hence, it can be presumed that suitable correction data is obtained. However, actually, it does not mean that all users have detection devices such as scanners. In addition, there are a variety of scanners which differ in capability, characteristics, etc. Thus, there is a possibility that a discrepancy may occur in detection results depending on devices used. Consequently, it does not necessarily follow that suitable calibration takes place.

In contrast, color deviation correction by visual detection is slightly inferior to the detection by means of a scanner from the standpoint of stability or the like, but significant detection accuracy can be expected by using the adjacency comparison method.

However, in the case of recent printing apparatuses, in particular, in ink-jet printers that use colored ink, for the purpose of attaining an improved image quality, printing systems that use Y, M, C ink having a ordinary concentration (high concentration ink) as well as LY, LM, LC ink with the same hues but lower concentration (low concentration ink) are implemented in order to reduce particle-like appearance. In this case, since ink of the same color is collectively subjected to color deviation detection in the conventional adjacency comparison method. If there occurs a deviation in the balance of an ejection amount between a high concentration ink and a low concentration ink, there arises a problem of hampering the color deviation correction. In other words, in the case a high concentration ink and a low concentration ink are used together, there is need to consider not only a density balance among inks of different hues, but also a density balance between high concentration ink and low concentration ink. This point was not considered at all hitherto, and suitable correction data could not be obtained in some cases.

Furthermore, a printing system aiming at an improved image quality by using ink other than Y, M, C, and K, for instance, other ink (special ink) including typically, R, G, and B, is also implemented. However, in the case of such printing apparatus, no color deviation correction is implemented. Currently, there exists no color deviation detection using the adjacency comparison method in particular.

SUMMARY OF THE INVENTION

An object of the present invention is to permit optimization of a density balance among coloring materials so that printing free of color deviation can be achieved, in the case of using a plurality of densities for coloring materials having the same color, or in the case of using other coloring material in addition to coloring materials Y, M, C, and K.

In a first aspect of the present invention, there is provided a printing information processing apparatus which conducts processing for printing test patterns used for color deviation correction processing in the printing apparatus by making at least one ordinary coloring material used for the printing apparatus and a special coloring material having a color belonging within a reproducible range based on the ordinary coloring material, the predetermined printing characteristics, respectively, the printing information processing apparatus comprising:

means for forming a plurality of patches, each being formed with a reference area composed of a predetermined single-color within the color reproducible range in the coloring materials used to form the test patterns, and a test area adjacently positioned to the reference area and formed by using at least one the coloring materials;

wherein each of the plurality of patches includes areas in which at least either of the reference area or the test area contains the special coloring materials.

In a second aspect of the present invention, there is provided a printing apparatus which conducts processing for printing test patterns used for color deviation correction processing in the printing apparatus by making at least one ordinary coloring material used for the printing apparatus and a special coloring material having a color belonging within a reproducible range based on the ordinary coloring material, the predetermined printing characteristics, respectively, the printing apparatus comprising:

means for forming a plurality of patches each being formed with a reference area composed of a predetermined single-color within the color reproducible range in the coloring materials used to form the test patterns, and a test area adjacently positioned to the reference area and formed by using at least one the coloring materials;

wherein the plurality of patches each includes areas in which at least either of the reference area or the test area contains the special coloring material.

In a third aspect of the present invention, there is provided a test pattern forming method which conducts processing for printing test patterns used for color deviation correction processing in the printing apparatus by making at least one ordinary coloring material used for the printing apparatus and a special coloring material having a color belonging within a reproducible range based on the ordinary coloring material, the predetermined printing characteristics, respectively, the test pattern forming method comprising:

a step for forming a plurality of patches each being formed with a reference area composed of a predetermined single-color within the color reproducible range in the coloring materials used to form the test patterns, and a test area adjacently positioned to the reference area and formed by using at least one the coloring materials;

wherein the plurality of patches each includes areas in which at least either of the reference area or the test area contains the special coloring material.

In a fourth aspect of the present invention, there is provided a memory media which stores a program readable which conducts processing for printing test patterns used for color deviation correction processing in the printing apparatus by making at least one ordinary coloring material used for the printing apparatus and a special coloring material having a color belonging within a reproducible range based on the ordinary coloring material, the predetermined printing characteristics, respectively, the program comprising:

processing for forming a plurality of patches each being formed with a reference area composed of a predetermined single-color within the color reproducible range in the coloring materials used to form the test patterns, and a test area adjacently positioned to the reference area and formed by using at least one the coloring materials;

wherein the plurality of patches each includes areas in which at least either of the reference area or the test area contains the special coloring material.

In this manner, in the present invention, a test area and a reference area are formed at adjacent positions, and thus, in comparison between the reference area and the test area, good comparison results can be obtained by the Adjacency Comparison Method. In addition, since special coloring material is contained in either of the patterns, even if special coloring material with low frequency of use is contained in the coloring materials, it will be possible to detect density balance between the special coloring material and other ordinary coloring materials as well, and it will be possible to set suitable density balance for all coloring materials.

Therefore, for instance, in the case a plurality of densities are used for the same color coloring material, or in the case low concentration ink CL or CM is used together with ordinary ink such as C, M, Y, or K, suitable density balance can be set for all ink, thereby preventing the occurrence of color deviation in advance.

The above and other objects, effects, features, and advantages of the present invention will become more apparent from the following description of embodiments thereof taken in conjunction with the accompanying drawings.

BRIEF DESCRIPTION OF THE DRAWINGS

FIG. 5 is a flow chart illustrating procedures for color deviation detection and correction in the first embodiment of the present invention;

FIG. 5A is a flow chart illustrating the boundary correction method described In Embodiment 1 of this invention;

FIG. 6A is an explanatory view illustrating a detection pattern to be formed by coloring materials C, M, and Y in the first embodiment of the present invention;

FIG. 6B is an explanatory view illustrating a detection pattern to be formed by coloring materials LC, LM, and LY in the first embodiment of the present patent;

FIGS. 7A–7C are views illustrating an example of how to set correction data in the case calibration is conducted on the basis of detection patterns indicated in FIGS. 6A, 6B, and 6C;

FIGS. 8A and 8B are explanatory views illustrating a color deviation pattern to be formed by coloring materials C, M, and Y in the second embodiment of the present invention;

FIG. 9 is an explanatory view illustrating a color deviation detection pattern in the third embodiment of the present invention;

Figure 11:
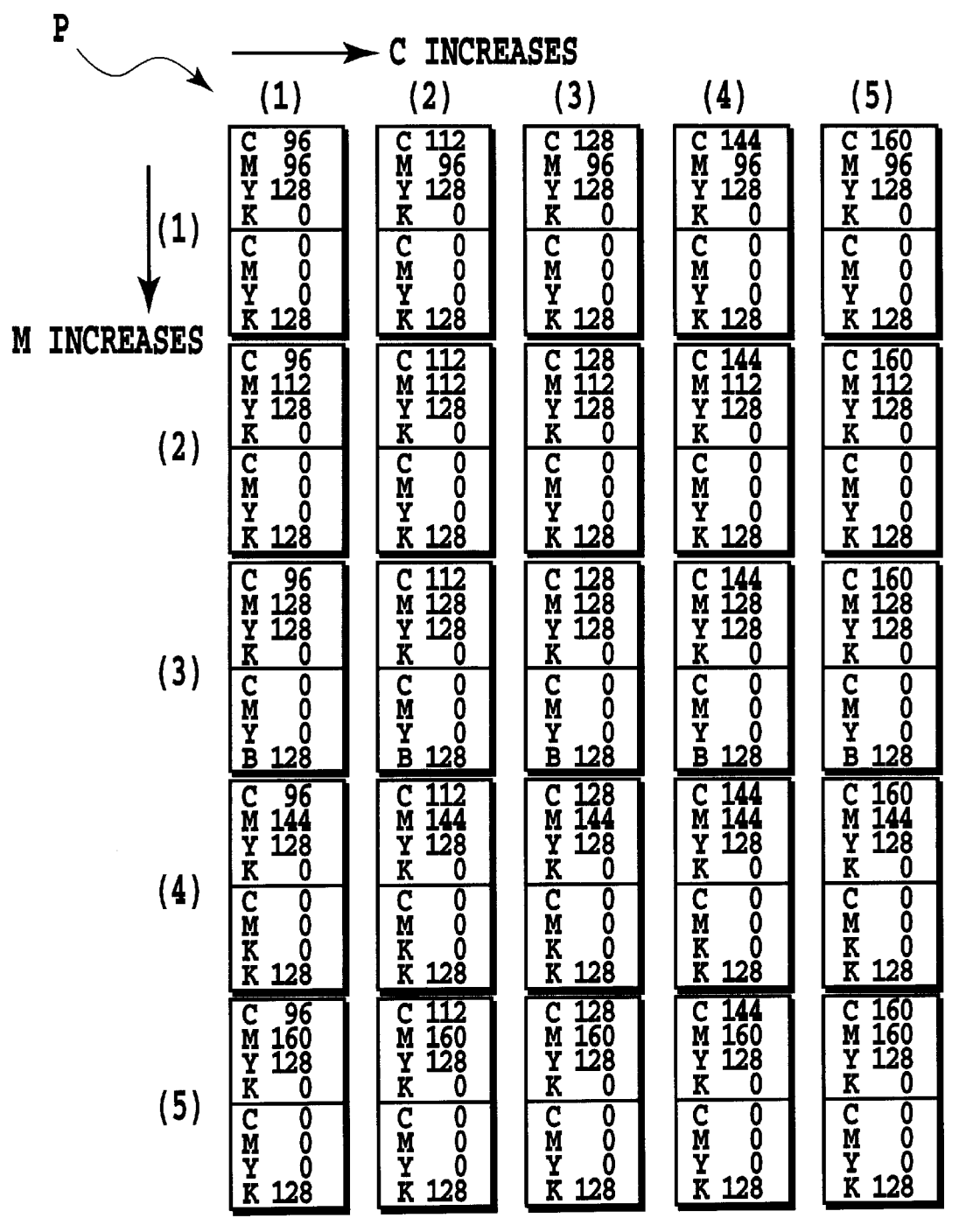

FIG. 11 is an explanatory view illustrating a conventional detection pattern.

DETAILED DESCRIPTION OF PREFERRED EMBODIMENTS

The First Embodiment

Hereinafter, explanation will be given of first and third embodiments in reference to the drawings.

<Outline of Printing Apparatus>

First of all, explanation will be given of the outline of a printing apparatus which is used in embodiments according to the present invention. The printing apparatus 200 In this embodiment is a color printing apparatus which uses an ink jet system, and its main part is a printer 200a having a structure shown in FIG. 1.

Figure 1:
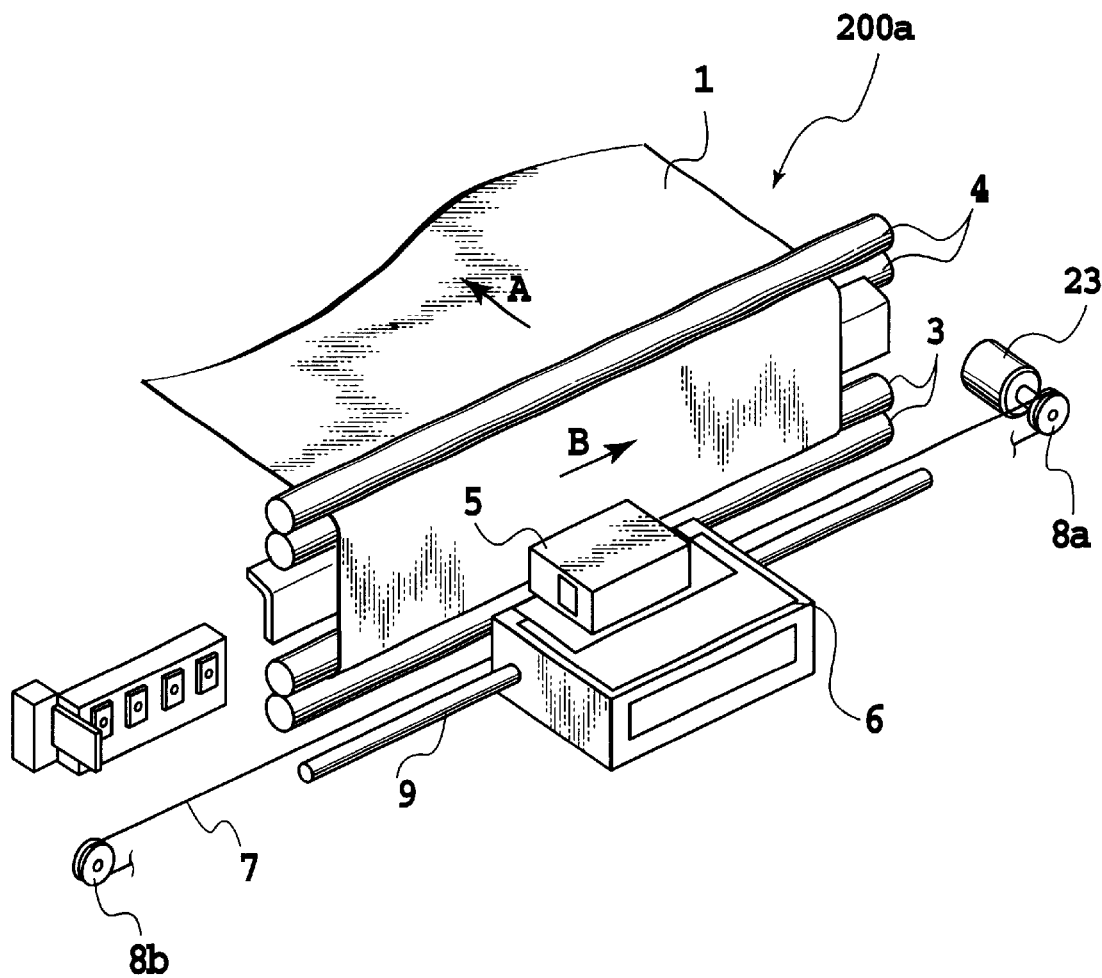
FIG. 1 is a schematic perspective view showing an essential mechanism of a printing apparatus according to each of embodiments of the present invention.

In FIG. 1, reference numeral 1 designates a recording sheet made of paper or a plastic sheet, and is contained in a cassette or the like in the state in which the plurality of sheets are stacked.

By the rotation of paper feeding rollers (not illustrated) in contact with one of the stacked paper sheets, the recording sheet is fed one by one from the cassette, and set up to a platen with a predetermined distance. Then, the recording sheet set up to the platen is carried in the direction indicated by an arrow A by a pair of first carrier rollers 3 and 3 and a pair of second carrier rollers 4 and 4.

Reference numeral 5 is a printing head in the ink jet system for conducting printing on the recording sheet. To this printing head 5, ink is supplied from an ink cartridge (not illustrated). The ink is ejected from a plurality of nozzles disposed in the printing head 5 in accordance with image signals. This printing head 5 and the ink cartridge are mounted on a carriage 6. This carriage 6 is connected to a carriage motor 23 via a belt 7 and pulleys 8a and 8b. Thus, by driving the carriage motor 23, the carriage 6 will make a reciprocating motion along a guide shaft 9, and the main scanning is performed. The printing head 5 in this embodiment normally ejects four color inks consisting of K(black), C(cyan), M(magenta) and Y(yellow) at ordinary density used in 4-color printing and three low-concentration inks LC, LM and LY, or seven colored ink in total, and it enables printing of higher quality which is very close to photographs. Furthermore, as for the structure of tanks and head, although they will not be discussed in details here, known means may be used.

In the printing, the printing head 5 ejects ink on the recording sheet 1 in accordance with the image signals while moving in the main scanning direction (in the direction indicated by the arrow), and forms an ink image. Then, as required, the printing head 5 will return to the home position, and an ink recovery device eliminates the nozzle clogging, and by the driving of the two pairs of carrier rollers 3 and 4, the recording sheet will be moved by one line in the direction indicated by the arrow A. By repeating this operation, a predetermined image is found on the recording sheet.

Figure 2:
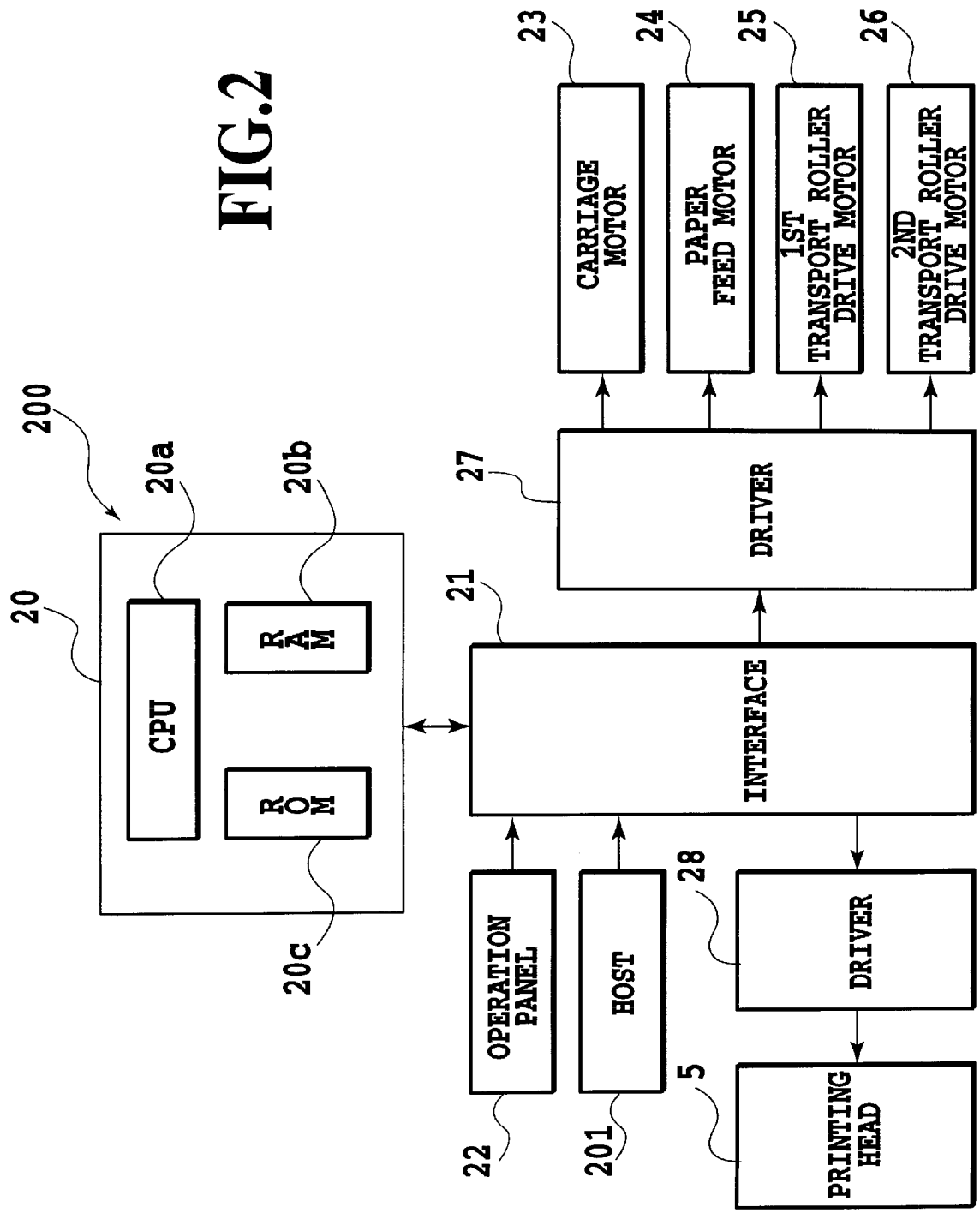
FIG. 2 is a block diagram illustrating a structure of control section for the printing apparatus shown in FIG. 1.

Next, explanation will be made on a control system for controlling the drive of each member of the printing apparatus. As shown in FIG. 2, this control system is equipped with an operation controller 20 which possesses control programs executed by a CPU 20a such as a micro-processor, a ROM 20c which stores various data, and a RAM 20b which is used as the work area of the CPU 20a and also temporarily stores various data such as printing image data. To this operation controller 20 are connected a driver 27 for driving from an interface 21, an operation panel 22, motors (a carriage motor 23, a paper feeder motor 24, a first carrier roller driving motor 25, and a second carrier roller driving motor 26), and a driver 28 for driving the printing head.

The operation controller 20 will conduct input and output of various information (for instance, pitches of characters or types of characters) from a host 201, described later, via the interface 21, and input and output of the image signals (input and output of information), which are sent from and received to an external apparatus.

In addition, the controller 20 will output ON and OFF signals for driving each of the motors 23 to 26 via the interface 21 and the image signals, and driving of each part is conducted in response to signals.

<Outline of Image Processing Apparatus>

Next, explanation will be made of a printing information processing apparatus that forms data to be executed by the printing operation in the printing apparatus 200.

Figure 3:
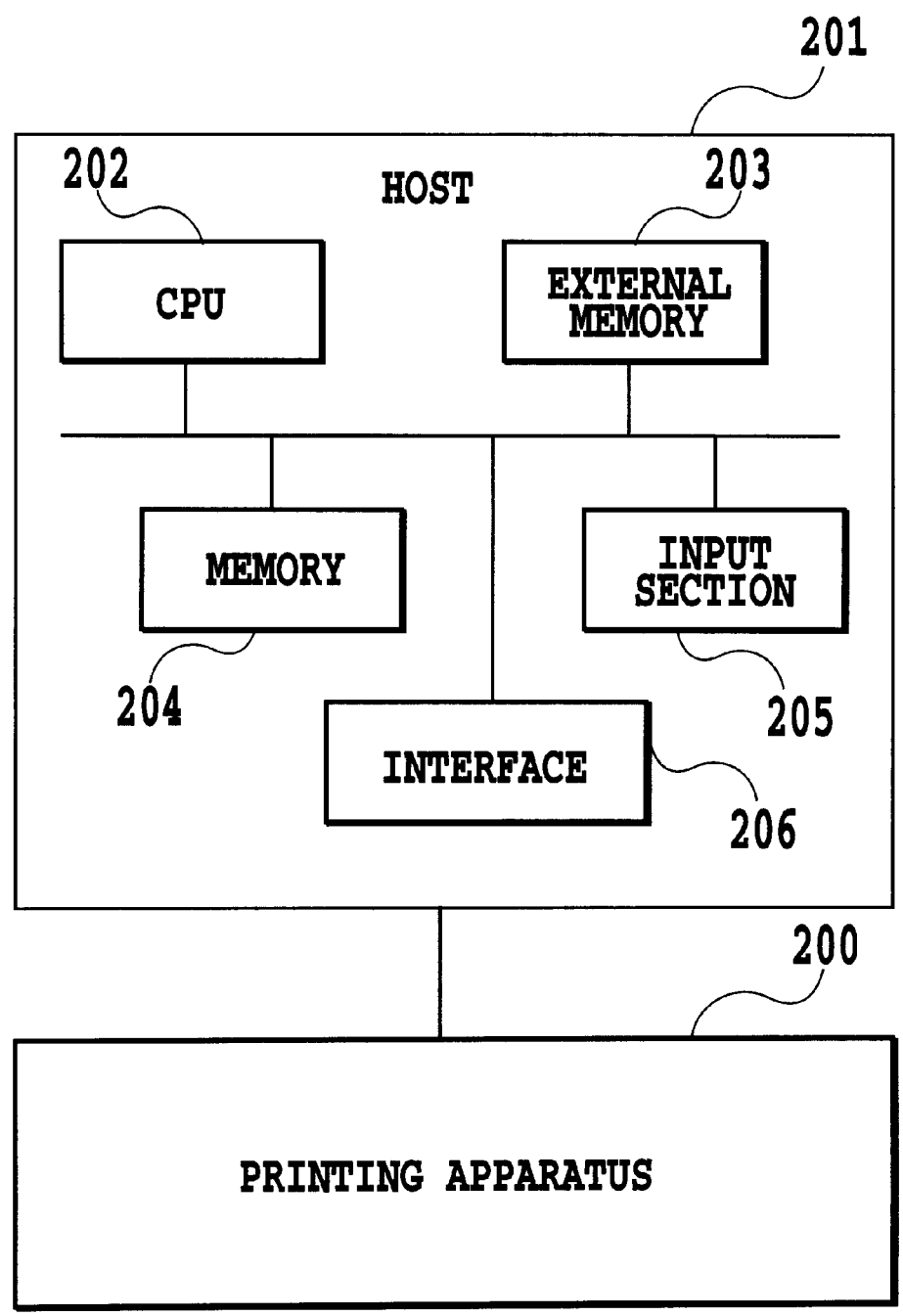
FIG. 3 is a block diagram illustrating a structure of a printing information processing apparatus in the embodiment of the present invention.

FIG. 3 illustrates a host computer (hereinafter simply referred to as "a host") used as an information processing apparatus in each of the embodiments. In the drawing, the host 201 is equipped with a CPU 202, a memory 204 (printing information generating means), an external memory 203, an input section 205, and an interface 206 that connects to the printing apparatus 200. The CPU 202 realizes the procedures of color processing and quantization, described later, in order to execute the program that is stored in the memory 204. This program and printing information are stored in the external memory 203, and after reading from this memory, it is fed to the CPU 202, and temporarily stored in the memory 204. The host 201 is connected to the printing apparatus 200 via the interface 206, and it will send the image data that has undergone the color processing to the printing apparatus 200, and the printing operation will be executed.

Figure 4:
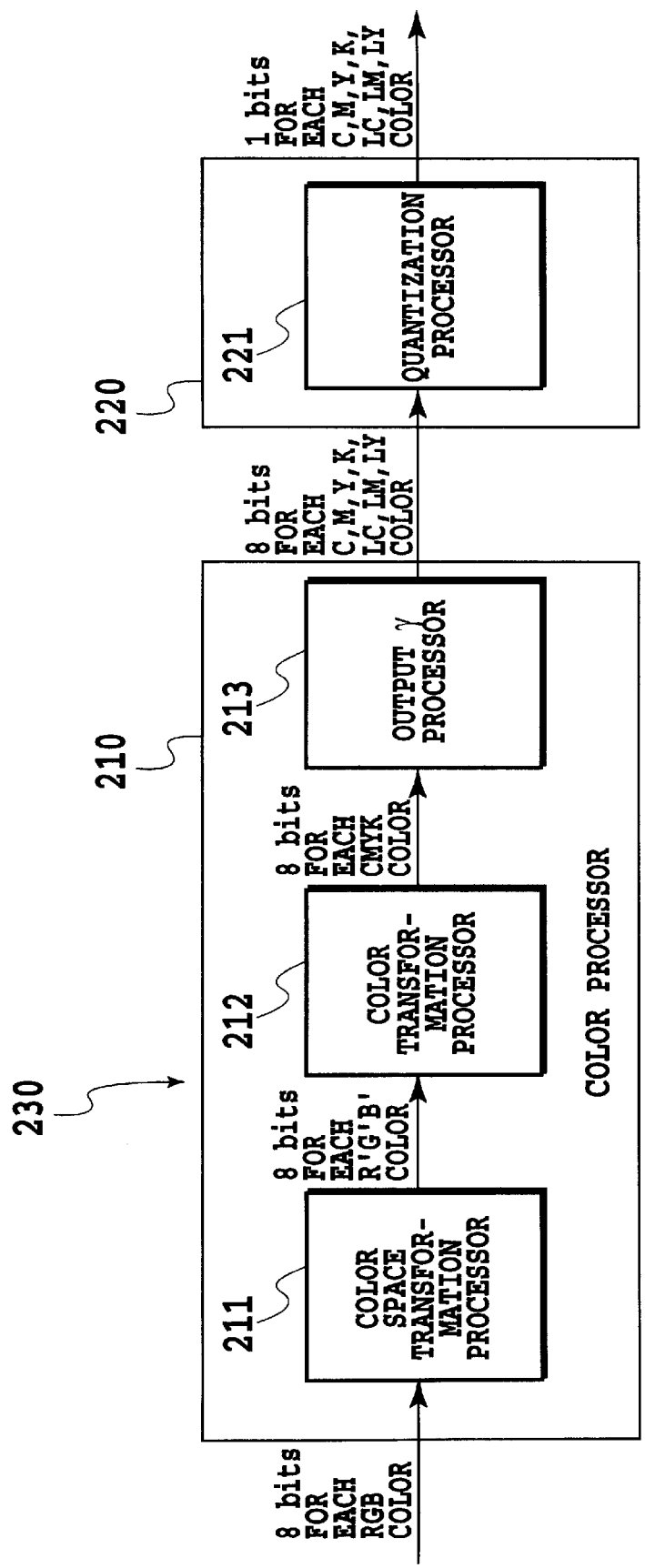
FIG. 4 is a block diagram illustrating a schematic structure of an image processing section in the embodiment of the present invention.

Furthermore, FIG. 4 is a functional block diagram illustrating the function of an image processor 230 that is realized by the host 201. This image processor 230 outputs the image data of R, G and B, each color consisting of 8 bits (256 gradation) which has been input as 1-bit data of each of the colors C, M, Y, K, LC, LM and LY, and it comprises a color processor 210 and a quantizer 220. The color processor 210 comprises a color space transformation processor 211, and a color transformation processor 212, and an output γ processor 213. Among them, the color space transformation processor 211 and the color transformation processor 212 are composed of a three-dimensional LUT (a Look Up Table) and the output γ processor 213 is composed of a one-dimensional LUT (a Look Up Table). Furthermore, each of the LUTs is stored in the memory 204 in the host computer 201.

In the image processor 230 having the above-described arrangement, bit data of each of the colors R, G and B read from the external memory is first of all converted to 8-bit data of each of colors R', G' and B' by the three-dimensional LUT. This processing is referred to as color space transformation processing (Pre-Stage Color Processing), and it is conversion processing for correcting the difference between the color space of an input image and the reproduced color space of the output apparatus. The 8-bit data of each of the colors R', G' and B' that have undergone color space transformation processing are converted into the following 8-bit data of each of the colors C, M, Y, K, LC, LM and LY by the three-dimensional LUT. This color transformation processing is referred to as post-stage color processing, and it is conversion processing for correcting the difference between the color space of the input image and the reproduced color space of the output apparatus.

Furthermore, the 8-bit data of each color R', G', B' that have undergone pre-stage color processing are converted to 8-bit data of each of the colors C, M, Y, K, LC, LM and LY by the three-dimensional LUT which composes the following color transformation processor 212. This color transformation processing is referred to as the post-stage color processing, and it involves conversion processing of the RGB system colors of the input system into the C, M, Y and K (LC, LM and LY) system colors of the output system. Furthermore, the image data to be input are in most cases three primary colors (R, G and B) of the additive color mixtures for illuminants such as displays, but in the case of a printer in which the colors are represented by the reflection of light, coloring materials of the three primary colors (C, M, Y) of the subtractive color mixtures are used, and therefore, the color transformation is necessary.

The three-dimensional LUT used for pre-stage color processing and the three-dimensional LUT used for the post-stage color processing discretely maintains the data, and although the data between the maintained data are obtained by interpolation. Since this interpolation method is a publicly known technology, detailed explanation of the interpolation is omitted.

The 8-bit data of each of the colors C, M, Y, K, LC, LM and LY, that have undergone the post-stage color processing, undergoes output γ correction by the one-dimensional LUT that composes the output γ processor 213. In most cases, the relationship between the number of printing dots per unit area and output characteristics (reflection density, etc.) will not become linear. Thus, γ correction can secure the linear relationship between the input level of the 8-bit C, M, Y, K, LC, LM and LY and the output characteristics at that time. The respective differences of the output characteristics for the printing head that prints each of the color materials detected by the color deviation detector, described later, can be realized by changing the input-output relationship of the one-dimensional LUT. For instance, in the case where the output characteristic values of the printing head to print the C coloring material are larger than expected output values, as described later, the input-output relationship of the one-dimensional LUT is changed so as to compensate to achieve reproduction at gradation as expected, thus achieving the correction of individual differences of each equipment.

The above explanation is the outline of the image processor 230, and the 8-bit data of each of the color inputs R, G and B are converted into the 8-bit data of each of the color inks C, M, Y, K, LC, LM and LY possessed by the printing apparatus. The color printing apparatus in the present embodiment is a binary printing apparatus, so the 8-bit data of each of the colors C, M, Y, K, LC, LM and LY undergo quantization processing of one-bit data of each of the colors C, M, Y, K, LC, LM and LY in a quantization processor 221 at a next stage. In this embodiment, a quantization method based on an error diffusion method that enables the smooth expression of photographic half-tone images is realized by a binary printing apparatus. By the error diffusion method, the 8-bit data of each of the colors C, M, Y, K, LC, LM and LY undergo quantization, to form printing data of one-bit data for each of the colors C, M, Y, K, LC, LM and LY.

The details of the quantization method using this error diffusion method has been published in "Nikkei Electronics", May, 1987 (pages 50 through 65), as well as various other literatures. Since it is a publicly known technology, detailed explanation will be omitted here.

<Color Deviation Detection and Correction Method>

Next, explanation will be made on the color deviation detection and correction method by the host 201 and the printing apparatus 200 In this embodiment.

The host 201 allows the printing apparatus 200 to be operated in a normal mode in which a normal printing operation for printing characters and graphics is performed, and in a detection and correction mode in which color deviation detection and correction, described later, can be made. However, when a power source is turned on in an initial state, the printing apparatus 200 is set to the normal mode. In this printing mode, the normal printing data stored in the memory 204 is read, and the data processed by the image processor 230 is sent to the printing apparatus 200 so that the image is formed.

Furthermore, in the case where color deviation occurs in the image to be formed and the degradation of the image quality is acknowledged, the correction mode is selected and the color deviation and correction are conducted in order to improve the image quality. In selecting this mode, the user selects this mode on a UI (USER INTERFACE) screen of the printer driver, not illustrated, and executes it.

Figure 5B:
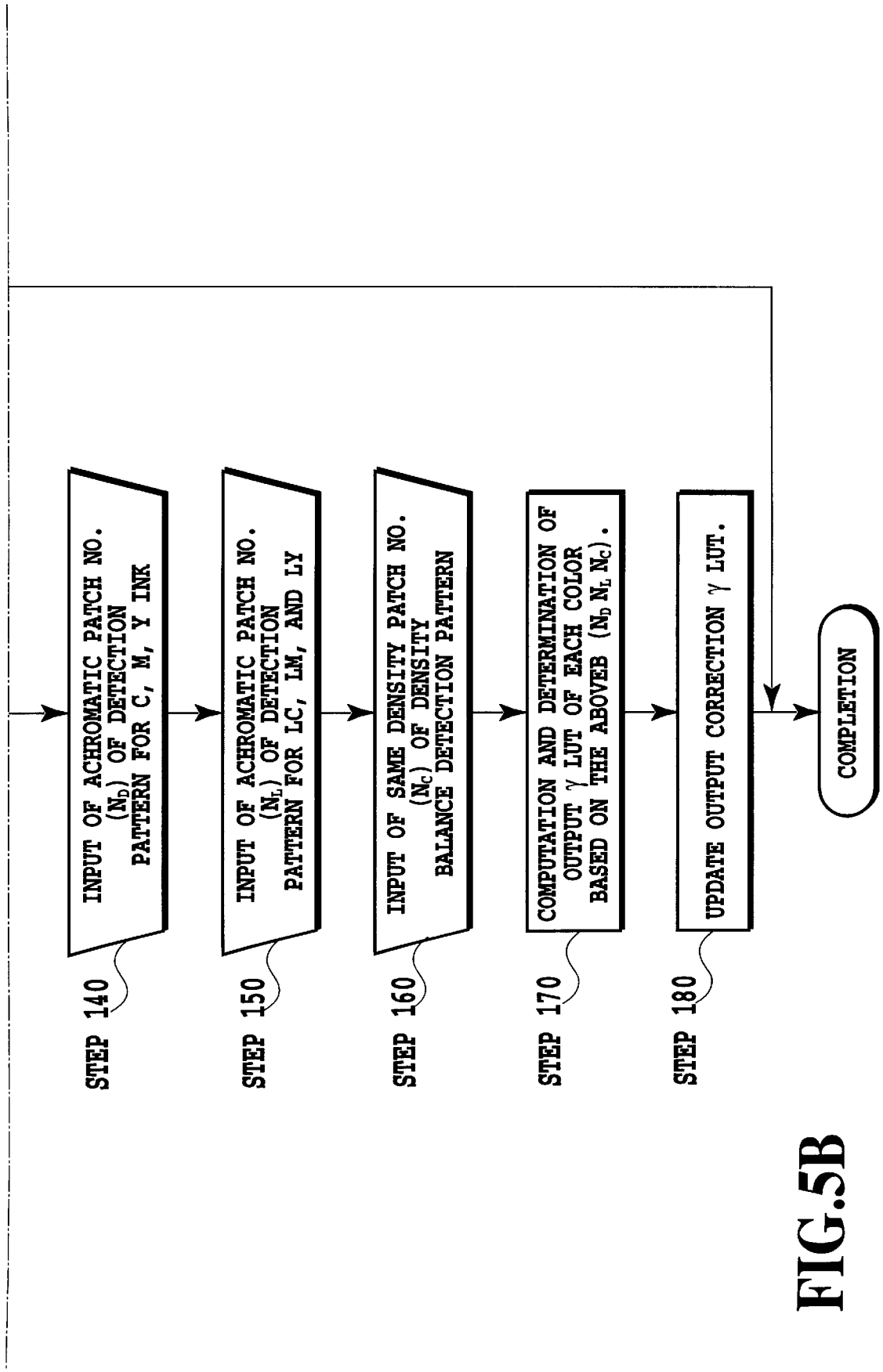
FIG. 5B is a flow chart illustrating the boundary correction method described in Embodiment 1 of this invention.

FIG. 5 shows the arrangement of the flow charts of FIGS. 5A and 5B which illustrate the processing in the case of color deviation detection and correction. If the color deviation detection and correction mode is selected in the printer (Step 100), the operation and processing illustrated in the flow charts of FIGS. 5A and 5B will be conducted in order.

In other words, in Step 110, first of all, color deviation detection pattern data are read from the memory 204, and the image processing is conducted on the data. The data are sent to the printing apparatus 200 via the interface 206 of the host 201 illustrated in FIG. 3, and then, the detection pattern is stored.

In this embodiment, three different types of detection pattern data are read from the memory 204. Three types of detection patterns PA, PB and PC respectively illustrated in FIGS. 6A, 6B and 6C are formed in accordance with each of the detection patterns.

Figure 6B:
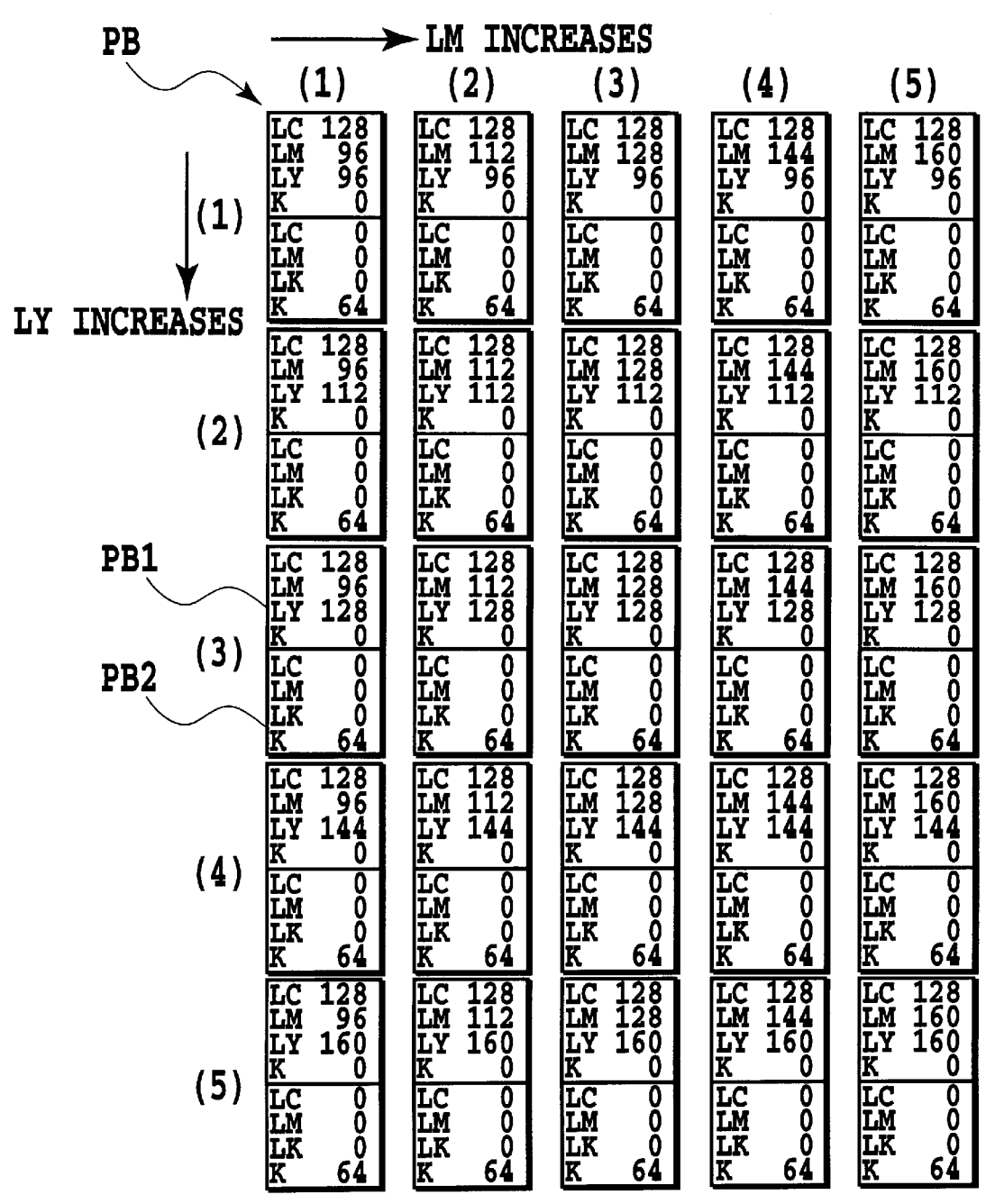
Figure 6C:
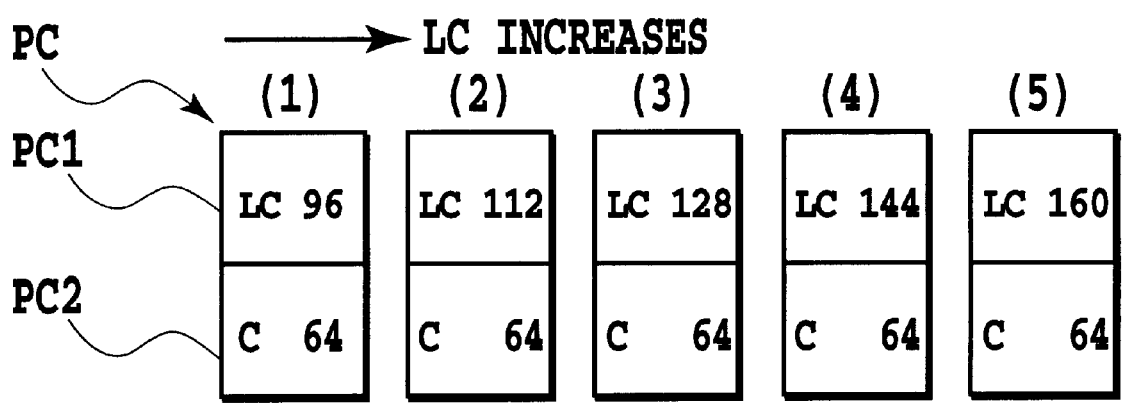
FIG. 6C is an explanatory view illustrating the detection pattern to be formed by coloring materials LC and C.

In other words, in the case of the detection pattern PA illustrated in FIG. 6A, it is a color deviation detection pattern using a high concentration ink group consisting of C, M, Y and K (a first coloring material group); in the case of detection pattern PB illustrated in FIG. 6B, it is a color deviation detection pattern using a low concentration ink group consisting of IC, LM, LY and K (a second coloring material group); and in the case of detection pattern PC (a third test pattern) illustrated in FIG. 6C, it is a color deviation detection pattern of a third coloring material group using both the high concentration ink group and the low concentration ink group of the same hues out of both the above-described coloring material groups.

In FIG. 6A and FIG. 6B, the plurality of detection patterns are arranged such that patches composed of a pair of top and bottom frames in contact with each other in a vertical and horizontal matrix-like manner (in this case five in both the vertical direction and the horizontal direction). Here, the numbers (1) to (5) attached along the vertical and horizontal sides of each of the detection patterns are numbers which indicate the positions of the patches in the vertical direction and the horizontal direction. The detection patterns PA is composed of patches PA (1, 1) to PA (5, 5), and another detection pattern PB is composed of patches PB (1, 1) to PB (5, 5).

In addition, the upper side frames PA1 and PB1 of the respective detection patterns PA and PB compose first and second test pattern areas for judging the color deviation. The first test area PA1 forms an almost achromatic color process black (PCBk) by mixing C, M and Y (ordinary coloring materials). The second test area PB1 forms an almost achromatic gray color (PCBk) by mixing LC, LM and LY (specific coloring materials). Furthermore, lower side frames PA2 and PB2 of the detection patterns PA and PB are reference areas that are formed only with the single achromatic color K coloring material.

The four numbers written in the respective frames of the test areas PA1 and PB1 of the detection patterns PA and PB and the reference areas PA2 and PB2 indicate the multi-value gradation levels of C, M, Y and K and LC, LM, LY and K from the top.

Furthermore, the detection pattern PC illustrated in FIG. 6C is made by arranging a plurality of a set of patches (a pattern set), which is composed of a pair of upper and lower frames PC1 and PC2 in contact with each other, in a horizontal direction (in this case, five), and the detection pattern PC is composed of PC (0) to PC (5). Also in this detection pattern PC, the top frame PC1 out of the frames is a test area, and the bottom frame PC2 is a reference area. The LC value of the test area PC1 is changed per pattern, and the value of the reference area PC2 is constant.

As described above, when three types of detection patterns are printed, next, the user conducts color deviation detection based on the respective detection patterns PA, PB and PC.

This color deviation detection is conducted by selecting a patch of the test area having the closest color to the reference area color (a patch having less color deviation) for each of the detection patterns PA, PB and PC, that is, it is detection which uses a so-called adjacent comparison method. In the detection pattern PA, the gradation value of the reference area is 128. Furthermore, in the case of the detection pattern PB, the gradation value is 64. Thus, although there are differences in density, they are all achromatic colors. Therefore, the detection of color deviation in both the color deviation detection patterns PA and PB can be conducted by judging how achromatic the test area is.

The detection pattern PC is also detected by utilizing the adjacent comparison method in comparing the reference area with the test area. However, in this case, since both the areas are the same in hue, the densities of the chromatic colors are compared.

As described above, after conducting patch selection in each of the detection patterns PA, PB and PC, in next steps 120, 130 and 140, the patch number before the selection is input from the UI screen of the host 201. Here, with the coloring materials C, M and Y in this embodiment, if the printing head for printing each of the coloring materials is the head for ejecting a main ejection amount (a maximum ejection amount×½), the test pattern (C=M=Y=128) for a center patch PA (3, 3) of FIG. 6A will be selected as the most achromatic color. However, in the case where the test areas of other patches are selected, the printing apparatus, in which such detection pattern is printed, has an output characteristic balance deviation (that is, color deviation occurs) in each printing head which ejects the coloring materials C, M and Y. There are 25 choices for selecting the patches to be detected here. It is possible to judge as to how the balance of the printing characteristics of the printing head is deviated based on the detection information on which patch becomes most achromatic. In other words, corresponding to the patches, five types of γ tables are prepared for each color. In order to simplify the explanation here, numbers from 1 to 5 are attached to the colors. The patch printed in the main ejection amount is made No. 3. Within each patch, the number is increased from 1 to 5 from a small multi-value level to a larger one. Thus, in FIG. 6A, if the upper left patch PA (1, 1) is selected, in the γ tables of the five types prepared for each of the coloring materials C, M and Y, the γ table second, the γ table No. 1 and the γ table No. 1 are selected for C, M and Y.

The same goes for the case illustrated in FIG. 6B. In the test area (LC=LM=LY=128) of the center patch PB (3, 3), if the printing head for printing each of the coloring materials is the head for ejecting the main ejection amount (a maximum ejection amount×½), the test pattern (C=M=Y=128) for the patch will be selected as the most achromatic color. Furthermore, in the same manner, the numbers from 1 to 5 are attached to the γ tables of each of the coloring materials.

In the case illustrated in FIG. 6C, the printing head for printing each of the coloring materials C and LC is the head for the main ejection amount, the test area (LC=128) and the reference area (C=64) at the center patch will have the closest densities among the five patches. This patch is equivalent to No. 3 of the Table of the C at the reference area, and the test areas correspond to No. 1 to No. 5 in the lower order of the multi-value gradation level of LC.

If the operator inputs, from the input section 205, the patch numbers that are selected from each of the detection patterns PA, PB and PC (Steps 140 to 160), the CPU 202 will read the Table number. (No. 1 to No. 5) of each color of the test area corresponding to the input patch number, and based on the Table number, the combination of output γ actually used in the image processing is determined by computation, described later (Step 170), and then, renewal (calibration) of the output γ table is performed (Step 180).

In the γ correction at this time, the balance of the three colors C, M and Y and the balance of the three colors LC, LM and LY can be judged only in FIG. 6A and FIG. 6B, respectively, but with this alone, the balance between the high concentration ink and the low concentration ink cannot be judged. Since the correlation between the high concentration ink and low concentration ink cannot be obtained, sufficient picture quality may not be able to be achieved.

Thus, in the present embodiment, at the time of calibrating the high concentration ink and the low concentration ink, the balance in density between the high concentration ink and low concentration ink is made possible. In other words, by detecting the density balance of C and LC, the balance of ejection amount of C and LC is maintained, and a calibration in consideration of the ejection amount balance can be executed. In other words, the density balance of the three colors C, M and Y and the density balance of the three colors LC, LM and LY are compensated with an offset. Consequently, the balance of the six colors, C, M, Y, LC, LM and LY is obtained, and the combination of the one-dimensional LUTs (the output γ tables) is determined. FIG. 7 illustrates examples of such combinations.

In FIG. 7, the density balance of C, M and Y, the density balance of LC, LM and LY, and the density balance of C and LC show the table number of output γ predetermined by judgment results based on detection patterns of FIG. 6A, FIG. 6B, and FIG. 6C, respectively. The offset amount is a value which is predetermined by the density balance between C and LC. If γ of LC is larger than that of C, the difference between the γ table numbers of C and LC will be given to LC, LM and LY side as an offset amount. In the meantime, if the γ table number of LC is smaller than that of C, the difference between the γ table numbers of C and LC will be given to C, M and Y side as an offset amount. (The offset amount of the other side will be 0). The computational result of adding this offset amount to the table numbers of C, M and Y, balance and LC, LM and LY balance will become the table number to be used finally, and the balance of each of the colors C, M, Y, LC, LM and LY will be adjusted.

By the above processing, the detection and correction of the color deviation are completed.

Furthermore, the renewal of the output γ table may be done by a method for changing address information of the table to be used, or it may be done by a system in which an active output γ table is copied to a predetermined memory area and used. The present invention is not restricted to the renewal system of the output γ table.

Furthermore, in the present embodiment, as explained in FIG. 6A, FIG. 6B and FIG. 6C, since the detection pattern data is 8-bit information of each of the colors C, M, Y, K, LC, LM and LY after converting (output γ processing) the multi-value data by the one-dimensional LUT 213, image processing following binarization processing is executed, and then, the data is output to the printing apparatus as printing information. However, the binarization and image processing may be conducted without going through the one-dimensional LUT, and it may also be conducted by an individual routine which converts the printing data of one bit for each of the colors C, M, Y, LK, LC, LM and LY separately from the detection pattern of the image processing routine that processes the user's image.

In addition, In the above-described embodiment, the balance detection of the high concentration ink and the low concentration ink and the combination of LC and C are used. However, the balance detection of the high concentration ink and the low concentration ink may be performed by combining LM with M and LY with Y.

Furthermore, in the above-described embodiment, the detection patterns having the test patterns with only the high concentration inks (C, M and Y) and the detection patterns having the test area with only the low concentration inks are used. However, in place of these detection patterns, detection patterns with a mixture of high concentration ink and low concentration ink may also be used. For instance, detection patterns with (LC, M and Y) and (C, M and LY) may also be used. Also in this case, a detection pattern for adjacent comparison of high concentration ink and low concentration ink of the same hues, in other words, needless to say, a detection pattern composed of a plurality of patches with LC and C, etc. will be necessary.

If the detection pattern illustrated in FIG. 6C is used, it will be possible to compensate for the balance of ejection amount for high concentration ink and low concentration ink of the same hue. Thus, it will also be possible to compensate for achromatic ink in different densities, and it will be possible to apply this invention to the correction of gradation for achromatic color.

Second Embodiment

Next, explanation will be made on a second embodiment.

In the second embodiment, information for forming a detection pattern corresponding to each ink is supplied to an ink jet printing apparatus using inks of six colors of C, M, Y, K, LC and LM. In recent years, in the case of ink jet printers, the number of six-color printing system is increasing. The reason is that the granular size of ink Y is not so significant, and LY is not necessary.

Figure 8A:
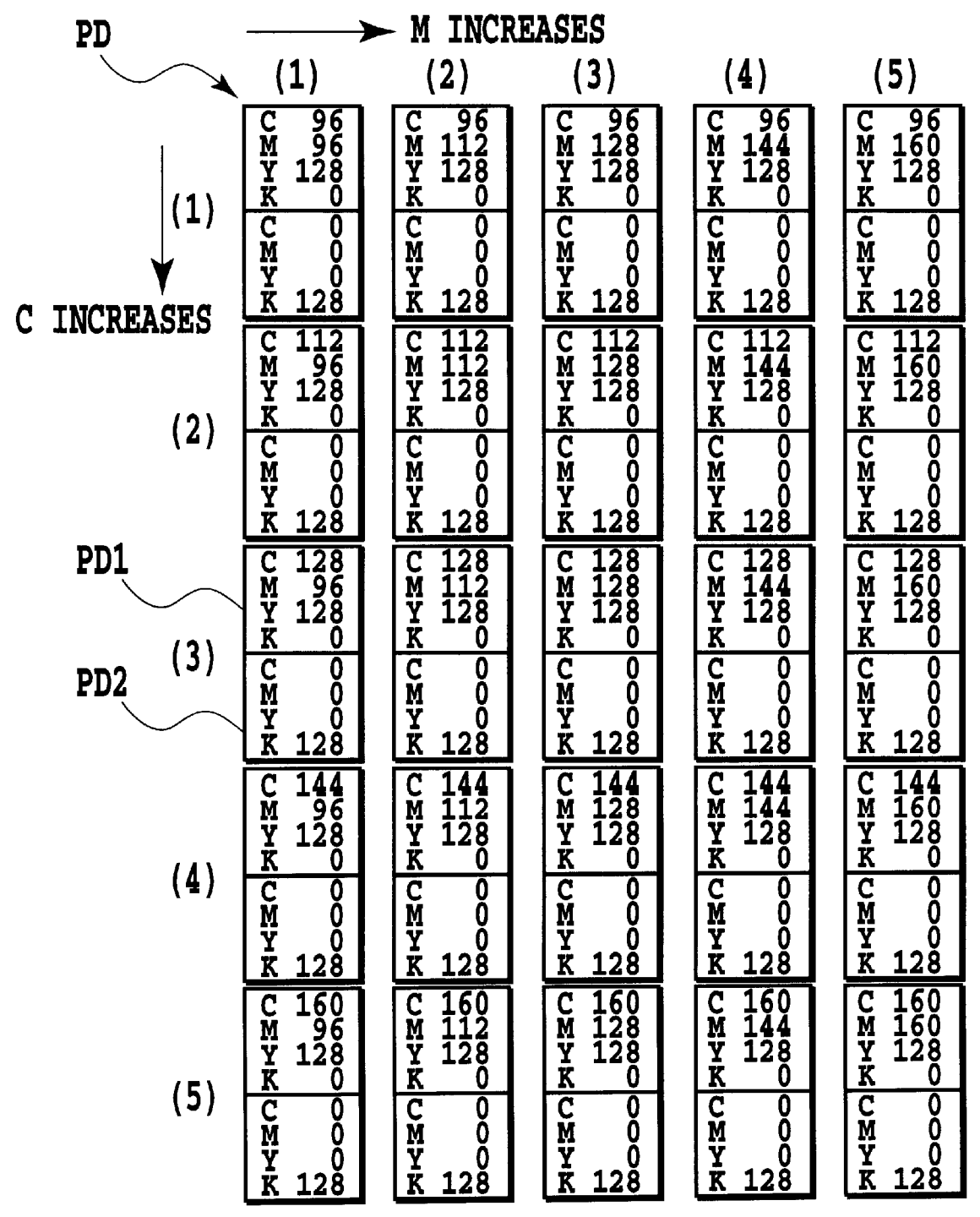
Figure 8B:
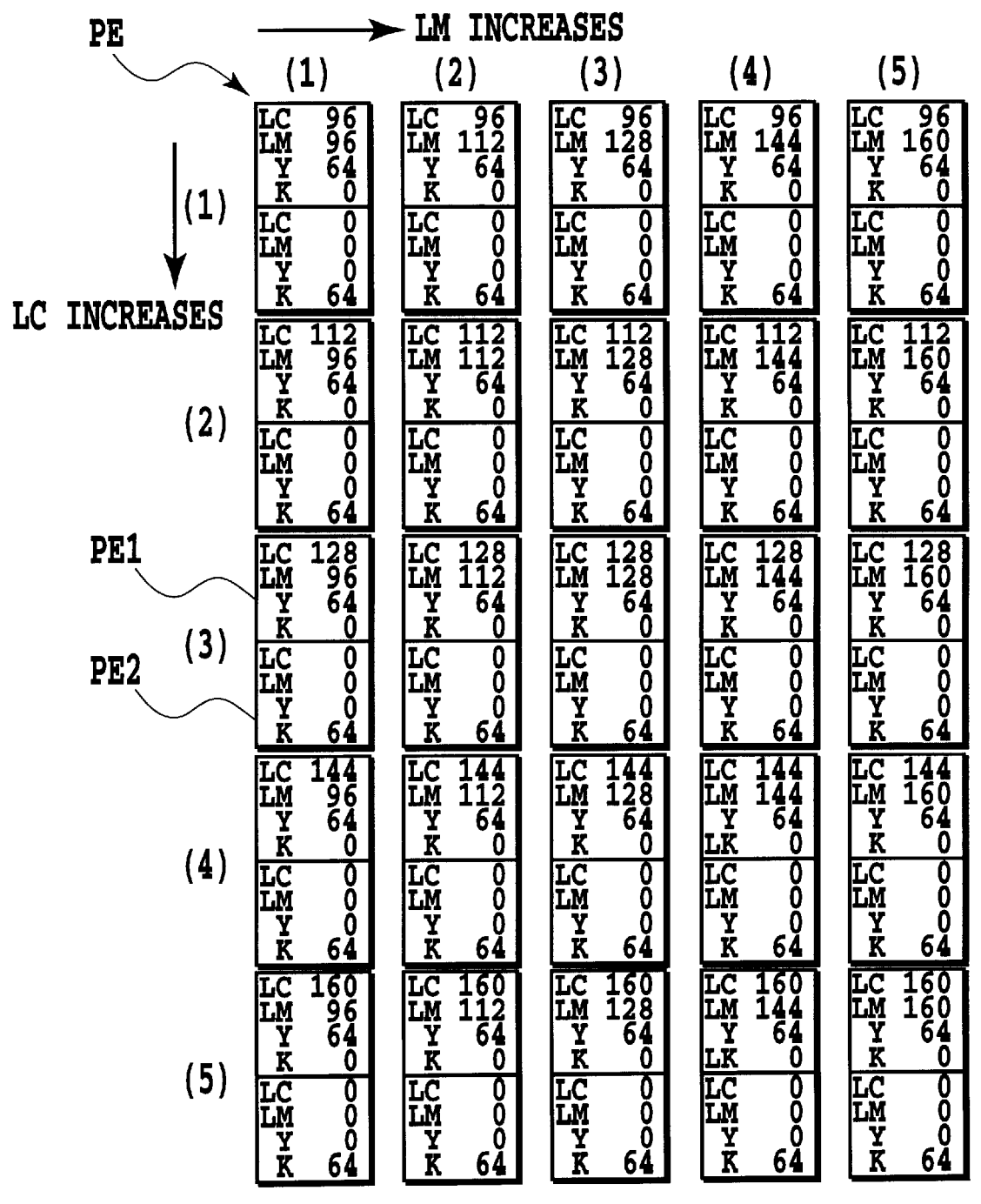

In this second embodiment, detection pattern data for forming two types of detection patterns illustrated in FIG. 8A and FIG. 8B are stored in the memory 204 (refer to FIG. 3.) The data are suitably read in the correction mode, and then, the detection patterns will be formed by the printing apparatus 200. Furthermore, the basic structures of the printing apparatus and information processing apparatus are similar to those illustrated in FIG. 1 through FIG. 4 in the first embodiment.

In other words, a detection pattern PD formed here is a color deviation pattern using the first coloring material group consisting of high concentration inks of C, M and Y, and another detection pattern PE is a color deviation detection pattern using the second coloring material group consisting of low concentration inks such as LC and LM (special color inks) and ink Y.

The detection patterns PD and PE arrange a set of patches (a pattern set) composed of pairs of top and bottom frames PD1 and PD2 and PE1 and PE2 in contact with each other in a vertical and horizontal matrix-like manner (in this case five in each of both the vertical direction and the horizontal direction). The detection pattern PD is composed of patches of PD (1, 1) to PD (5, 5). Furthermore, in each patch of the detection patterns PD and PE, the top frame (a first test pattern area) PD1 and a second test pattern area PE1, which compose the patch, are formed by mixed colors (PCBk) formed by mixing coloring materials of chromatic colors C, M and Y and LC, LM and Y. Among the whole patches, the first test pattern is formed at the first test area PD1, and the second test pattern is formed by the second test area. Furthermore, in each patch of the detection pattern PD and PE, the lower frame (a first reference area) PD2 and PE2 (a second reference area) both are formed by only the achromatic K coloring material, and reference patterns are formed with them.

In these detection patterns PD and PE, four numbers described in the test patterns PD1 and PE1 and reference patterns PD2 and PE2 indicate multi-value gradations of C, M, Y and K and LC, LM, Y and K from the top.

When the two types of detection patterns are printed, the user uses these detection patterns and visually conducts color deviation detection. In this embodiment, if the printing head that prints with each of the coloring materials is the head for ejecting the central ejection amount, the test area PD1 (C=M=Y=128) in a center patch PD (3, 3) in the detection pattern will be the most achromatic color. However, in the case where the other patches in the detection patterns are selected, the printing apparatus that forms such detection patterns will have deviation in the balance of output characteristics (i.e., color deviation) in each of the printing heads for C, M and Y.

It can be judged based on the detection information as to what degree the balance deviation of the printing characteristics of the printing head is and which patch is achromatic color.

Furthermore, the same can go for the other detection pattern PE. If the printing head for printing color materials is the head with the main ejection amount, the test pattern PE1 (LC=LM=128, Y=64) of the center patch PE (3, 3) will be selected if it is the most achromatic color.

In accordance with the patch number information that has been input, the combination of output γ which is actually used is computed and determined from among output γ by image processing, and an output γ table is renewed. This point is similar to the case in the first embodiment.

At this point, the balance of the three colors C, M and Y and the balance of the three colors LC, LM and Y can be suitably set based on the detection results of the respective the detection patterns PD and PE. In addition, since both the detection patterns PD and PE use Y ink, the density balance between the Y ink and the C or M ink and the density balance between the Y ink and the LC or LM ink can be set, respectively. Thus, according to the interrelations among these balances, the balance relations among C, M and LC, LM ink, in other words, the relations among the high concentration ink and the low concentration ink can also be set inevitably.

Therefore, in this second embodiment, there is not required the preparation of detection patterns illustrated in FIG. 6C in the first embodiment. Visual detection work and input operation of detection results can be alleviated. Thus, good work efficiency can be obtained, and further, reduction in capacity required for storage of detection pattern data, and reduction of computing and processing operations can be achieved. Furthermore, other configurations, functions and advantageous results are similar to those in the above-described embodiment, and therefore, detailed explanation will be omitted.

In this embodiment, the gradation values of the Y ink in both the patterns illustrated in FIGS. 8A and 8B have been fixed, but it is also possible to fix the gradation values of other inks. However, since in such a case, it is necessary to calculate the offset amount conducted in the first embodiment, the computing and processing becomes slightly complicated in comparison with the present embodiment.

Third Embodiment

Next, explanation will be given of a third embodiment of the present invention.

An information processing apparatus (host) in this third embodiment is designed such that in a printing apparatus used for other coloring materials (special coloring materials) besides the ordinary coloring materials C, M, Y and K, detection patterns can be formed in order to compensate for color deviations.

Generally speaking, if inks of three colors C, M and Y are used, basically all or a part of an area of the desired characteristics can be reproduced. Thus, in the third embodiment, colors similar to the special coloring materials are formed by using C, M and Y inks and conducting adjacent comparison between mixed colors and the special colors, the color deviation detection and correction of the special colors can be made.

In other words, the memory of the host in this embodiment stores therein data for forming detection patterns with special color ink besides data for forming the detection patterns in the first embodiment. On the correction mode for calibration (γ correction), both of the detection patterns are formed by the printing apparatus, and the user judges the color deviation based on such detection patterns.

Figure 9:
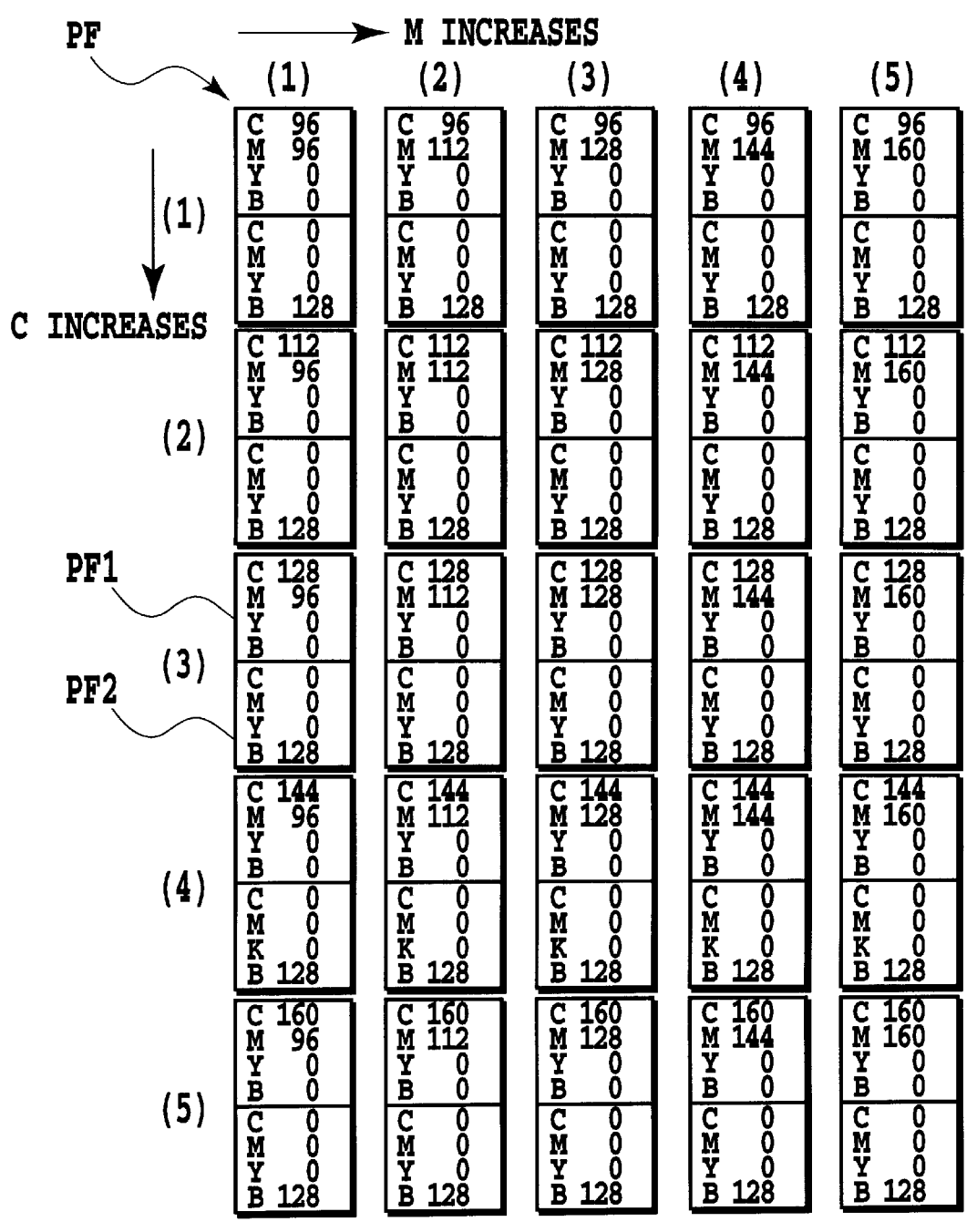

In FIG. 9, a special detection pattern formed in this embodiment is shown. Furthermore, in this case where C, M and Y are used as ordinary colors and B (blue) ink is used as other special color.

In FIG. 9, a detection pattern consists of a pair of top and bottom frames, that is, a plurality of patches, each having a test area PF1 and a reference area PF2, are arranged in a vertical and horizontal matrix-like manner (five in this case). Four numbers written in the top of each patch show the multi-value gradations of C, M, Y and B from the top. The top frame PF1 of each patch is a test area for judging the color deviation of the patch, and this is a blue pattern composed of a mixed color of C, M and Y. In the case of this area, the values of C and M are changed according to the position. The lower frame PF2 is a reference area that uses only a single-color B ink. The value B of this reference area is constant.

After the detection pattern is printed, the user selects a patch that is visually closest to the color of the top and bottom frames. In the case of coloring materials C, M, Y and B in the present embodiment, if the printing head for printing each coloring material is the head for ejecting the main ejection amount, the test area (C=M=128, Y=0) of a center patch PF (3, 3) in FIG. 9 and the reference area (B=128) are selected as the closest colors. However, in the case where other patches in the test area are selected, there is a deviation in the balance of output characteristics (i.e., color deviation) of the C, M, Y and B printing heads of the printing apparatus that printed such detection pattern. Thus, it is possible to judge as to what degree the deviation in the balance of printing characteristics of the printing head is.

As mentioned above, by judging the balance (color deviation) among B and C, M, Y, it is possible to judge the balance (color deviation) of C, M, Y and B as well. By correcting the γ table of each color based on such color deviation detection results, it is possible to compensate the color deviation of each of the colors C, M, Y and B.

Furthermore, in this embodiment, in the color processor 210 shown in FIG. 4, it is necessary for the color transformation processor 212 to conduct conversion of R', G', B', C, M, Y, K, and B. However, since this can be conducted by publicly known technology, explanation will be omitted here.

Fourth Embodiment

Figure 10:
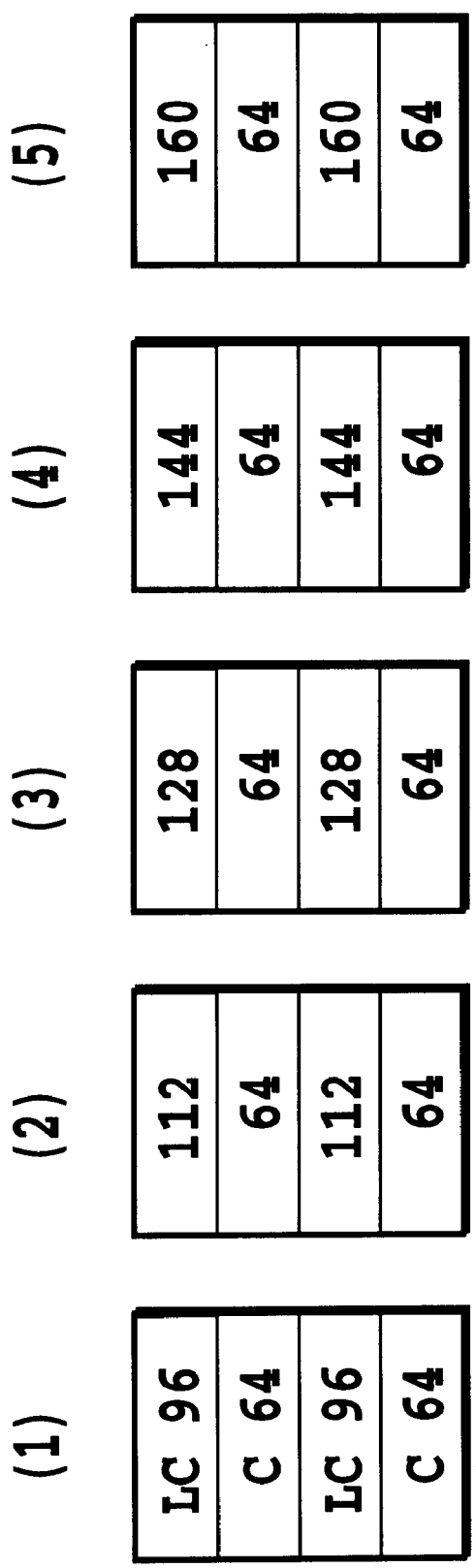
FIG. 10 is a explanatory view illustrating a color deviation detection pattern to be formed in the fourth embodiment of the present invention.

FIG. 10 illustrates test patterns to be printed in a fourth embodiment of the present invention.

The test area of this embodiment makes one patch by setting up the arrangement by repeating twice, in the vertical direction in FIG. 10, a set of areas consisting of a pair of a test area and a reference area illustrated in FIG. 6C. In other words, in each patch, a first area and a third area are test areas, and a second area and a fourth area are reference areas that are used as comparison standards (criteria). The gradation of each coloring material of the test area In the patch pattern shown in FIG. 10, LC increases by 16 in each of five stages rightward in FIG. 10.

Furthermore, the respective test patterns, that is, the number of repetitions and the direction of the repetitions are set suitably in accordance with the coloring materials used in the apparatus. Needless to say, the test patterns will not be restricted to the patterns shown in FIG. 10. For instance, in one patch, the number of repetitions may be increased in one direction.

This fourth embodiment is effective in the case where a patch recognized as mutually close in color is not identified in both areas. When a pair of a test area and a reference area is compared by the adjacent comparison method, it becomes possible to easily judge the patches in which the colors are close to each other by making a patch in which stripes of reference areas and test areas are alternately repeated. In other words, depending on the variation width of the output characteristics (an ejection amount, etc.) of the printing head, even if differences occur in the correcting amount, it is possible to identify whether or not the whole pattern has uniformity by the patch which may be judged as having a reference area color close to the test area color. In other words, the visual sense of a human being has a characteristics in which the larger the frequency of the stripes, the more difficult the recognition of the difference in color among the stripes, and this embodiment utilizes these visual characteristics of the human being, thereby balancing the detection accuracy and the correcting accuracy (correction width) based on the adjacent comparison method.

However, in the case where the frequency level becomes excessive by high, on the contrary, all patches seem to have uniformity, and judgment becomes more difficult. How to set the cycle of the stripes varies with the printing head, printing ink, printing media, etc. that are used in the printing apparatus, and it depends on the design matter.

Others

In the third embodiment, explanation has been made on the color deviation correction in the case where the ink B (blue) is used as the coloring material of the special color in addition to each of the coloring materials C, M, Y and K. The present invention can also be applied to other special inks.

In other words, basically, in the case where C, M and Y inks are used, as mentioned previously, special color reproduction is possible for all or a part of the area. The reproduction is possible for all or a part of the area in the case of C, M and Y inks even when complementary colors of the special colors are used. Thus, with the combination of the special ink and the C, M and Y inks which compose a complementary color, achromatic color is formed. It is also possible to detect the color deviation by comparing this achromatic color with K. Since the detection patterns and correction methods used in this case are similar to those explained previously, explanation is omitted here.

In addition, according to the present invention, in the case where the printing operation is conducted by using the plurality of special inks, for instance, it is also applicable to the case where the special inks such as G and R are used. Furthermore, if the achromatic color reproduction is possible with the plurality of special inks, the color deviation among the ordinary ink C, M and Y, and the color deviation among the special color inks shall be detected, respectively, and in addition, the balance of the ordinary inks and the special color inks shall be detected by the method described in the third embodiment. It is possible to conduct correction of each single color by using the concept of offset computation used in the ink with different densities.

In the above-described embodiment, explanation has been made by exemplifying the ink-jet printing system. However, the present invention is also applicable to printing apparatuses other than the ink-jet printing system.

Other Embodiments

The present invention may be applied to a system consisting of a plurality of devices (such as a host computer, an interface device, a reader and a printer) or to single device (such as a copying machine and a facsimile).

The present invention also includes a configuration in which a computer in an apparatus or system, which is connected with a variety of devices so as to realize functions of the foregoing examples shown in FIGS. 9 to 11 and FIGS. 15 to 21, is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magneto optical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

As explained above, in the case where the printing operation is conducted by the printing apparatus equipped with at least one ordinary coloring material and the special color having color belonging to color reproduction range based on the ordinary coloring material, the test patterns are formed by forming the plurality of test areas by changing the gradation from at least one coloring material out of the coloring materials equipped with the printing apparatus. The patches are formed by forming, at the positions adjacent to the test pattern, the reference area consisting of a predetermined single color within the reproducible range in the coloring materials used in the test patterns, and since one of the two patterns is made to contain the special coloring material, even in case the special coloring material is used besides the ordinary coloring materials as coloring materials, so long as the coloring material of which the reference area is within the reproducible range based on the test area, not only the density balance between the ordinary coloring materials but also the density balance between the special coloring materials and the density balance between the ordinary coloring materials and the special coloring materials can be suitably judged, and color deviation can be prevented in advance.

Incidentally, in the above-described embodiments according to the present invention, the density balance between the high-concentration ink and the low-concentration ink has been simply referred to as the density balance between the image recorded by the recording head with the high-concentration ink (the ordinary coloring material) and the image recorded by the recording head with the low-concentration ink (the special coloring material).

The present invention has been described in detail with respect to preferred embodiments, and it will now be apparent from the foregoing to those skilled in the art that changes and modifications may be made without departing from the invention in its broader aspects, and it is the intention, therefore, in the apparent claims to cover all such changes and modifications as fall within the true spirit of the invention.

What is claimed is:

1. A printing information processing apparatus which conducts processing for printing test patterns used for color density balance correction processing in a printing apparatus by making at least one ordinary coloring material used for the printing apparatus and a special coloring material having a color belonging within a reproducible range based on the ordinary coloring material, predetermined printing characteristics, respectively, the printing information processing apparatus comprising:

storing means which stores patch data used for forming a plurality of patches, each of the patches being formed with a reference area composed of a predetermined color within the color reproducible range of the coloring materials used to form the test patterns, and a test area adjacently positioned to the reference area and formed by using at least one of the coloring materials, the test areas being formed with different amounts of the coloring materials; and reading means for reading the patch data from the storing means, wherein each of the plurality of patches includes areas in which at least one of the reference area and the test area contains the special coloring material.

2. A printing information processing apparatus according to claim 1, wherein the patch data includes:

first test area information for forming a plurality of first test areas by changing gradation of at least one coloring material of a first coloring material group, each of the first test areas being formed by using the first coloring material group composed of a combination of a plurality of coloring materials among coloring materials equipped in the printing apparatus;

second test area information for forming a plurality of second test areas by changing the gradation of at least one coloring material of a second coloring material group, each of the second test areas being formed by using a second coloring material group composed of a combination of coloring materials other than coloring materials belonging to the first coloring material group among a plurality of coloring materials equipped in the printing apparatus;

first reference area information for forming a plurality of first reference areas each adjacently positioned to respective ones of the first test areas, each of the first reference areas being formed by using a predetermined single-color within the color reproducible range based on the first coloring material group;

second reference area information for forming a plurality of second reference areas each adjacently positioned to respective ones of the first test areas, each of the second reference areas being formed by using a predetermined single-color within the color reproducible range based on the second coloring material group;

third test area information for forming a plurality of third test areas by changing a gradation of the third test areas to be formed by using coloring materials that belong to the second coloring material group and have the same hue as, but different densities than, the coloring materials used to form the third test areas; and third reference area information for forming a plurality of third reference areas each adjacently positioned to respective ones of the third test areas, the plurality of third reference areas being formed by using one coloring material out of the first coloring materials group.

3. A printing information processing apparatus according to claim 1, wherein the printing apparatus includes ordinary coloring materials including cyan, magenta and yellow, and special coloring materials including colors which are low density colors of cyan, magenta and yellow, the first coloring material group is composed of the ordinary coloring materials and the second coloring material group is composed of the special coloring material group.

4. A printing information processing apparatus according to claim 3, further comprising a color material of black as one of the ordinary color materials.

5. A printing information processing apparatus according to claim 1, wherein the patch data includes:
- first test area information for forming a plurality of first test areas by changing gradation of at least one coloring material of a first coloring material group, each of the first test areas being formed by using the first coloring material group composed of a combination of a plurality of coloring materials among coloring materials equipped in the printing apparatus;
- second test area information for forming a plurality of second test areas by changing the gradation of at least one coloring material out of a second coloring material group, each of the second test areas being formed by using a second coloring material group composed of a combination of at least one coloring material belonging to the first material group and coloring materials other than the coloring materials belonging to the first coloring material group among a plurality of coloring materials equipped in the printing apparatus;
- first reference area information for forming a plurality of first reference areas each adjacently positioned to respective ones of the first test areas, each of the first reference areas being formed by using a predetermined single-color within the color reproducible range based on the first coloring material group; and
- second reference area information for forming a plurality of second reference areas each adjacently positioned to respective ones of the first test areas, each of the second reference areas being formed by using a predetermined single-color within the color reproducible range based on the second coloring material group.

6. A printing information processing apparatus according to claim 5, wherein the printing apparatus includes ordinary coloring materials including cyan, magenta, and yellow, and special coloring materials including colors which are low density colors of cyan, magenta, and yellow, the first coloring material group is composed of the ordinary coloring materials, and the second coloring material group is composed of two coloring materials out of the special coloring materials and one coloring material out of the ordinary coloring materials.

7. A printing information processing apparatus according to claim 6, further comprising a color material of black as one of the ordinary color materials.

8. A printing information processing apparatus according to claim 1, wherein the patch data includes:
- test area information for forming a plurality of test areas by changing gradation of at least one coloring material of a coloring material group, each of the test areas being formed by using the coloring material group composed of a combination of a plurality of coloring materials among coloring materials equipped in the printing apparatus; and
- reference area information for forming a plurality of reference areas each adjacently positioned to respective ones of the first test areas, each of the reference areas being formed by using a predetermined single-color within the color reproducible range based on the coloring material group, the coloring material group is composed of two ordinary coloring materials out of ordinary coloring materials including cyan, magenta and yellow,
- wherein the reference area information is information to form the reference area by using one color taken from the group consisting of red, green and blue.

9. A printing information processing apparatus according to claim any one of claims 1 to 8, wherein the test area and the reference area are alternately arranged in repetition for a plurality of patches.

10. A printing information processing apparatus according to any one of claims 1 to 8, wherein the printing apparatus uses thermal energy to generate a bubble in ink to eject the ink by a pressure of the bubble.

11. A printing apparatus for printing test patterns used for color density balance correction processing in said printing apparatus by making at least one ordinary coloring material used for the printing apparatus and a special coloring material having a color belonging within a reproducible range based on the ordinary coloring material, predetermined printing characteristics, respectively, the printing apparatus comprising:
- forming means for forming a plurality of patches, each patch being formed with a reference area composed of a predetermined color within the color reproducible range of the coloring materials used to form the test patterns, and a test area adjacently positioned to the reference area and formed by using at least one coloring material, the test areas being formed with different amounts of the coloring materials; and
- supplying means for supplying patch data used for forming the plurality of patches to the forming means,
- wherein the plurality of patches each includes areas in which at least one of the reference area and the test area contains the special coloring material.

12. A printing apparatus according to claim 11, wherein the patch data includes:
- first test area information for forming a plurality of first test areas by changing gradation of at least one coloring material of a first coloring material group, each of the first test areas being formed by using the first coloring material group composed of a combination of a plurality of coloring materials among coloring materials equipped in said printing apparatus;
- second test area information for forming a plurality of second test areas by changing the gradation of at least one coloring material of a second coloring material group, each of the second test areas being formed by using a second coloring material group composed of a combination of coloring materials other than coloring materials belong to the first coloring material group among a plurality of coloring materials equipped in said printing apparatus;
- first reference area information for forming a plurality of first reference areas each adjacently positioned to respective ones of the first test areas, each of the first reference areas being formed by using a predetermined single-color within the color reproducible range based on the first coloring material group;
- second reference area information for forming a plurality of second reference areas adjacently positioned to respective ones of the first test areas, each of the second reference areas being formed by using a predetermined single-color within the color reproducible range based on the second coloring material group;
- third test area information for forming a plurality of third test areas by changing a gradation of the third test areas being formed by using coloring materials that belong to the second coloring material group and have the same hue as, but different densities than, the coloring materials to form the third test areas; and
- third reference area information for forming a plurality of third reference areas, each adjacently positioned to respective ones of the third test areas, the plurality of third reference areas being formed by using one coloring material out of the first coloring materials group.

13. A printing apparatus according to claim 11, wherein the printing apparatus includes ordinary coloring materials including cyan, magenta and yellow, and special coloring materials including colors which are low density colors of cyan, magenta and yellow, the first coloring material group is composed of the ordinary coloring materials, and the second coloring material group is composed of the special coloring material group.

14. A printing apparatus according to claim 13, further comprising a color material of black as one of the ordinary color materials.

15. A printing apparatus according to claim 11, wherein the patch data includes:

first test area information for forming a plurality of first test areas by changing gradation of at least one coloring material of a first coloring material group, each of the first test areas being formed by using the first coloring material group composed of a combination of a plurality of coloring materials among coloring materials equipped in the printing apparatus;

second test area information for forming a plurality of second test areas by changing the gradation of at least one coloring material of a second coloring material group, each of the second test areas being formed by using a second coloring material group composed of a combination of at least one coloring material belonging to the first material group and coloring materials other than the coloring materials belonging to the first coloring material group among a plurality of coloring materials equipped in the printing apparatus;

first reference area information for forming a plurality of first reference areas each adjacently positioned to respective ones of the first test areas, each of the first reference areas being formed by using a predetermined single-color within the color reproducible range based on the first coloring material group; and second reference area information for forming a plurality of second reference areas each adjacently positioned to respective ones of the first test areas, each of the second reference areas being formed by using a predetermined single-color within the color reproducible range based on the second coloring material group.

16. A printing apparatus according to claim 15, wherein the printing apparatus includes ordinary coloring materials including cyan, magenta and yellow, and special coloring materials including colors which are low density colors of cyan, magenta and yellow, the first coloring material group is composed of the ordinary coloring materials, and the second coloring material group is composed of two coloring materials out of the special coloring materials and one coloring material out of the ordinary coloring materials.

17. A printing apparatus according to claim 16, further comprising a color material of black as one of the ordinary color materials.

18. A printing apparatus according to claim 11, wherein the patch data includes:

test area information for forming a plurality of test areas, by changing gradation of at least one coloring material out of a coloring material group, each of the test areas being formed by using the coloring material group consisting of a combination of a plurality of coloring materials among coloring materials equipped in the printing apparatus; and reference area information for forming a plurality of reference areas each adjacently positioned to respective ones of the first test areas, each of the reference areas being formed by using a predetermined single-color within the color reproducible range based on the coloring material group, the coloring material group is composed of two ordinary coloring materials out of ordinary coloring materials including cyan, magenta and yellow, wherein the reference information is information to form the reference area by using one color taken from the group consisting of red, green and blue.

19. A printing apparatus according to any one of claims 11 to 18, wherein the test area and the reference area are alternately arranged in repetition for a plurality of patches.

20. A printing information processing apparatus according to any one of claims 11 to 13, wherein the printing apparatus uses thermal energy to generate a bubble in ink to eject the ink by a pressure of the bubble.

21. A test pattern forming method for printing test patterns used for color density balance correction processing in a printing apparatus by making at least one ordinary coloring material used for the printing apparatus and a special coloring material having a color belonging within a reproducible range based on said ordinary coloring material, predetermined printing characteristics, respectively, the test pattern forming method comprising the steps of:

reading patch data from a memory which stores the patch data used for forming a plurality of patches; and forming the plurality of patches, each patch being formed with a reference area composed of a predetermined color within the color reproducible range of the coloring materials used to form the test patterns, and a test area adjacently positioned to the reference area and formed by using at least one of the coloring materials, the test areas being formed with different amounts of the coloring materials, wherein the plurality of patches each includes areas in which at least one of the reference area and the test area contains the special coloring material.

22. A test pattern forming method according to claim 21, wherein the test area and the reference area are alternately arranged in repetition for a plurality of patches.

23. A memory media which stores a readable program which conducts processing for printing test patterns used for color density balance correction processing in a printing apparatus by making at least one ordinary coloring material used for the printing apparatus and a special coloring material having a color belonging within a reproducible range based on the ordinary coloring material, predetermined printing characteristics, respectively, the program comprising:

processing for reading patch data from the memory media which stores the patch data used for forming a plurality of patches; and processing for forming the plurality of patches, each patch being formed with a reference area composed of a predetermined color within the color reproducible range of the coloring materials used to form the test patterns, and a test area adjacently positioned to the reference area and formed by using at least one of the coloring materials, the test areas being formed with different amounts of the coloring materials, wherein the plurality of patches each includes areas in which at least one of the reference area and the test area contains the special coloring material.

24. A program which conducts processing for printing test patterns used for color density balance correction processing in a printing apparatus by making at least one ordinary coloring material used for the printing apparatus and a special coloring material having a color belonging within a reproducible range based on the ordinary coloring material, predetermined printing characteristics, respectively, the program comprising:

processing for reading patch data from a memory which stores the patch data used for forming a plurality of patches; and processing for forming the plurality of patches, each patch being formed with a reference area composed of a predetermined color within the color reproducible range of the coloring materials used to form the test patterns, and a test area adjacently positioned to the reference area and formed by using at least one of the coloring materials, the test areas being formed with different amounts of the coloring materials, wherein the plurality of patches each includes areas in which at least one of the reference area and the test area contains the special coloring material.

* * * * *

UNITED STATES PATENT AND TRADEMARK OFFICE
CERTIFICATE OF CORRECTION

PATENT NO. : 6,505,909 B1
DATED : January 14, 2003
INVENTOR(S) : Kato et al.

It is certified that error appears in the above-identified patent and that said Letters Patent is hereby corrected as shown below:

Drawings,
Sheet 4 of 17, Fig. 4, "1 bits" should read -- 1 bit --.
Sheet 5 of 17, Fig. 5A, "USER PRINTTING" should read -- USER PRINTING --.
Sheet 6 of 17, Fig. 5B, "ABOVEB" should read -- ABOVE --.

Column 2,
Lines 4, "Is" should read -- is --.
Line 15, "M." should read -- M, --.

Column 4,
Lines 20, 39 and 59, "one" should read -- one of --.
Line 24, "materials." should read -- material. --.

Column 5,
Line 11, "one" should read -- one of --.
Line 52, "In" should read -- in --.

Column 6,
Line 7, "is a" should read -- is an --.
Line 23, "In" should read -- in --.

Column 11,
Line 62, "LC." should read -- LC, --.

Column 15,
Line 43, "In" should read -- in --.

Column 16,
Line 1, "istics" should read -- istic --.

UNITED STATES PATENT AND TRADEMARK OFFICE
CERTIFICATE OF CORRECTION

PATENT NO.   : 6,505,909 B1
DATED        : January 14, 2003
INVENTOR(S)  : Kato et al.

It is certified that error appears in the above-identified patent and that said Letters Patent is hereby corrected as shown below:

<u>Column 19,</u>
Line 67, "claim" should be deleted.

Signed and Sealed this

Eleventh Day of November, 2003

JAMES E. ROGAN
*Director of the United States Patent and Trademark Office*